(12) United States Patent
Kim et al.

(10) Patent No.: US 12,118,246 B2
(45) Date of Patent: Oct. 15, 2024

(54) METHOD OF OPERATING STORAGE DEVICE FOR RETENTION ENHANCEMENT AND STORAGE DEVICE PERFORMING THE SAME

(71) Applicant: SAMSUNG ELECTRONICS CO., LTD., Suwon-si (KR)

(72) Inventors: Hyunjin Kim, Seongnam-si (KR); Hyunduk Cho, Yongin-si (KR); Sangeun Lee, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 126 days.

(21) Appl. No.: 17/872,162

(22) Filed: Jul. 25, 2022

(65) Prior Publication Data

US 2023/0143943 A1  May 11, 2023

(30) Foreign Application Priority Data

Nov. 9, 2021 (KR) ............ 10-2021-0153052

(51) Int. Cl.
*G06F 3/06* (2006.01)
*G06F 11/10* (2006.01)
*G11C 16/22* (2006.01)
*G11C 16/30* (2006.01)

(52) U.S. Cl.
CPC .......... *G06F 3/0659* (2013.01); *G06F 3/0619* (2013.01); *G06F 3/0673* (2013.01)

(58) Field of Classification Search
CPC .... G06F 3/0659; G06F 3/0619; G06F 3/0673; G06F 3/0632; G06F 11/106; G06F 3/0679; Y02D 10/00; G11C 16/225; G11C 16/30
See application file for complete search history.

(56) References Cited

U.S. PATENT DOCUMENTS

| | | | |
|---|---|---|---|
| 6,931,582 B2 | 8/2005 | Tamura et al. | |
| 9,147,501 B2 | 9/2015 | Hung et al. | |
| 9,280,419 B2 | 3/2016 | Chunn et al. | |
| 9,952,791 B2 | 4/2018 | Jang et al. | |
| 10,387,260 B2* | 8/2019 | Hayashi | G06F 11/3041 |
| 10,679,703 B2 | 6/2020 | Lee et al. | |
| 10,949,113 B2 | 3/2021 | Cai et al. | |
| 11,017,837 B2 | 5/2021 | Hashimoto | |
| 11,487,340 B1* | 11/2022 | Tsien | G06F 1/3209 |
| 2012/0210076 A1 | 8/2012 | Jang et al. | |
| 2017/0090785 A1* | 3/2017 | Kashyap | G11C 16/10 |
| 2019/0101972 A1* | 4/2019 | Bibikar | G06F 1/3228 |

FOREIGN PATENT DOCUMENTS

| | | |
|---|---|---|
| KR | 20120091906 A | 8/2012 |
| KR | 20150066419 A | 6/2015 |
| KR | 1653999 B1 | 8/2016 |
| KR | 20190143311 A | 12/2019 |

* cited by examiner

*Primary Examiner* — Masud K Khan
(74) *Attorney, Agent, or Firm* — Fish & Richardson P.C.

(57) ABSTRACT

In a method of operating a storage device including a storage controller and a nonvolatile memory, the storage device is powered on based on an activation of an external power supply voltage. An establishment of communication with a host device is waited for, based on a link signal between the storage device and the host device. Without the establishment of communication with the host device, a retention enhancement operation is performed on the storage device by entering a retention enhancement mode and by providing at least one command from the storage controller to the nonvolatile memory.

20 Claims, 20 Drawing Sheets

METHOD OF OPERATING STORAGE DEVICE FOR RETENTION ENHANCEMENT AND STORAGE DEVICE PERFORMING THE SAME

CROSS-REFERENCE TO RELATED APPLICATION

This application claims priority under 35 USC § 119 to Korean Patent Application No. 10-2021-0153052 filed on Nov. 9, 2021 in the Korean Intellectual Property Office (KIPO), the contents of which are herein incorporated by reference in their entirety.

BACKGROUND

1. Technical Field

Exemplary embodiments relate generally to semiconductor integrated circuits, and more particularly to methods of operating storage devices for retention enhancement, and storage devices performing the methods.

2. Description of the Related Art

One or more semiconductor memory devices may be used in data storage devices. Examples of such data storage devices include solid state drives (SSDs). These types of data storage devices may have various design and/or performance advantages over hard disk drives (HDDs). Examples of potential advantages include the absence of moving mechanical parts, higher data access speeds, stability, durability, and/or low power consumption. Various systems, e.g., a laptop computers, vehicles, an airplanes, drones, etc., have adopted the SSDs for data storage.

In storage devices, endurance characteristics corresponding to the number of program/erase (P/E) cycles and retention characteristics corresponding to the maintenance of stored data may be in a trade-off relationship with each other. The storage devices may be used by adjusting the endurance characteristics and the retention characteristics depending on systems that include the storage devices, and various methods for enhancing the retention characteristics of the storage devices have been researched.

SUMMARY

At least one exemplary embodiment of the present disclosure provides a method of operating a storage device capable of performing a retention enhancement operation without the control of a host device.

At least one exemplary embodiment of the present disclosure provides a storage device performing the method.

According to exemplary embodiments, in a method of operating a storage device including a storage controller and a nonvolatile memory, the storage device is powered on based on an activation of an external power supply voltage. The establishment of communication with a host device is waited for, based on a link signal between the storage device and the host device. Without the establishment of communication with the host device, a retention enhancement operation is performed on the storage device by entering a retention enhancement mode and by providing at least one command from the storage controller to the nonvolatile memory.

According to exemplary embodiments, a storage device includes a storage controller and a nonvolatile memory controlled by the storage controller. The storage device is powered on based on an activation of an external power supply voltage. The storage controller waits for establishment of communication with a host device based on a link signal between the storage device and the host device. Without the establishment of communication with the host device, the storage controller performs a retention enhancement operation by entering a retention enhancement mode and by providing at least one command to the nonvolatile memory.

According to exemplary embodiments, in a method of operating a storage device including a storage controller and a nonvolatile memory, the storage device is powered on based on an activation of an external power supply voltage. The establishment of communication with a host device is waited for, based on a link signal between the storage device and the host device. In response to the establishment of communication with the host device being successfully completed, a normal operation mode is entered. A normal operation is performed in the normal operation mode. An establishment of communication waiting time starting from a time point at which the external power supply voltage is activated is measured. In response to the establishment of communication waiting time becoming longer than a first reference time, a retention enhancement mode is entered without the establishment of communication with the host device. A retention enhancement operation is performed in the retention enhancement mode by providing a read command and a reprogram command from the storage controller to the nonvolatile memory. In response to the establishment of communication with the host device being successfully completed in the retention enhancement mode, the retention enhancement mode is exited and the normal operation mode is entered. A criterion for determining whether data is degraded in the retention enhancement mode is higher than a criterion for determining whether data is degraded in the normal operation mode.

In the method of operating the storage device and the storage device according to exemplary embodiments, the retention enhancement operation may be performed to improve retention characteristics. For example, the storage device may enter the retention enhancement mode by itself and/or internally, without the establishment of communication with the host device, and may perform the retention enhancement operation. Accordingly, even when power is applied without the establishment of communication with the host device, the retention characteristics of the storage device may be improved and data integrity may be guaranteed. In addition, the degradation or deterioration of the retention characteristics due to power off may be prevented by simply using a power supply device that only supplies power.

BRIEF DESCRIPTION OF THE DRAWINGS

Illustrative, non-limiting exemplary embodiments will be more clearly understood from the following detailed description taken in conjunction with the accompanying drawings.

DETAILED DESCRIPTION OF THE PREFFERED EMBODIMENTS

Figure 1:
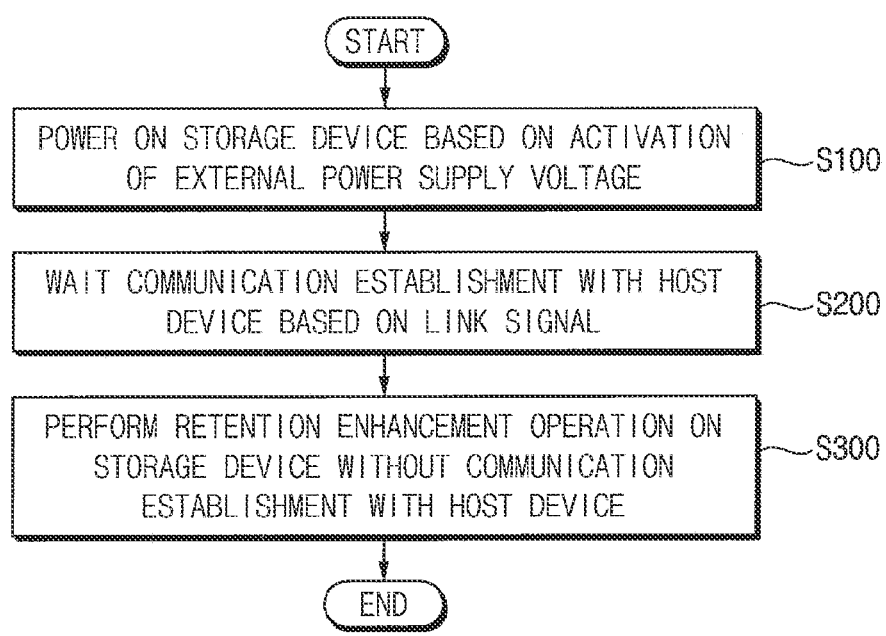
FIG. 1 is a flowchart illustrating a method of operating a storage device according to exemplary embodiments.

Various exemplary embodiments will be described more fully with reference to the accompanying drawings, in which such embodiments are illustrated. The present invention may, however, be embodied in many different forms and should not be construed as limited to the exemplary embodiments set forth herein. Like reference numerals refer to like elements throughout this application.

FIG. 1 is a flowchart illustrating a method of operating a storage device according to exemplary embodiments.

Referring to FIG. 1, a method of operating a storage device according to example embodiments is performed by a storage device that includes a storage controller and a nonvolatile memory. The storage device operates based on an external power supply voltage, and exchanges a link signal and data with a host device that is located or disposed externally of the storage device. Configurations of the storage device and a storage system including the storage device will be described with reference to FIGS. 3 through 6.

In the method of operating the storage device according to exemplary embodiments, the storage device is powered on based on an activation of the external power supply voltage (step S100). For example, the external power supply voltage may be provided from the host device or a separate power supply device.

The storage device waits for establishment of communication (or communication connection, link establishment, or link connection) with the host device based on the link signal between the host device and the storage device (step S200). For example, the link signal may be implemented in various manners depending on an interface scheme between the host device and the storage device.

A retention enhancement operation is performed on the storage device, without the establishment of communication with the host device (or the establishment of communication between the host device and the storage device), by entering a retention enhancement mode and by providing at least one command from the storage controller to the nonvolatile memory (step S300). For example, the at least one command may include a read command, and may further include a reprogram command. Step S300 will be described with reference to FIGS. 2, 8, 12 and 14.

In some exemplary embodiments, steps S200 and S300 may be associated with or related to an operation of a firmware layer executed by the storage controller. An operation of a link layer and/or a physical layer (PHY) included in the storage controller may be required for the establishment of communication with the host device, which will be described with reference to FIG. 7.

In the method of operating the storage device according to exemplary embodiments, the retention enhancement operation may be performed to improve the retention characteristics. For example, the storage device may enter the retention enhancement mode by itself and/or internally, without the establishment of communication with the host device, and may perform the retention enhancement operation. Accordingly, even when power is applied without the establishment of communication with the host device, the retention characteristics of the storage device may be improved and the data integrity may be guaranteed. In addition, the degradation or deterioration of the retention characteristics due to power off may be prevented by simply using a power supply device that supplies power only.

Figure 2:
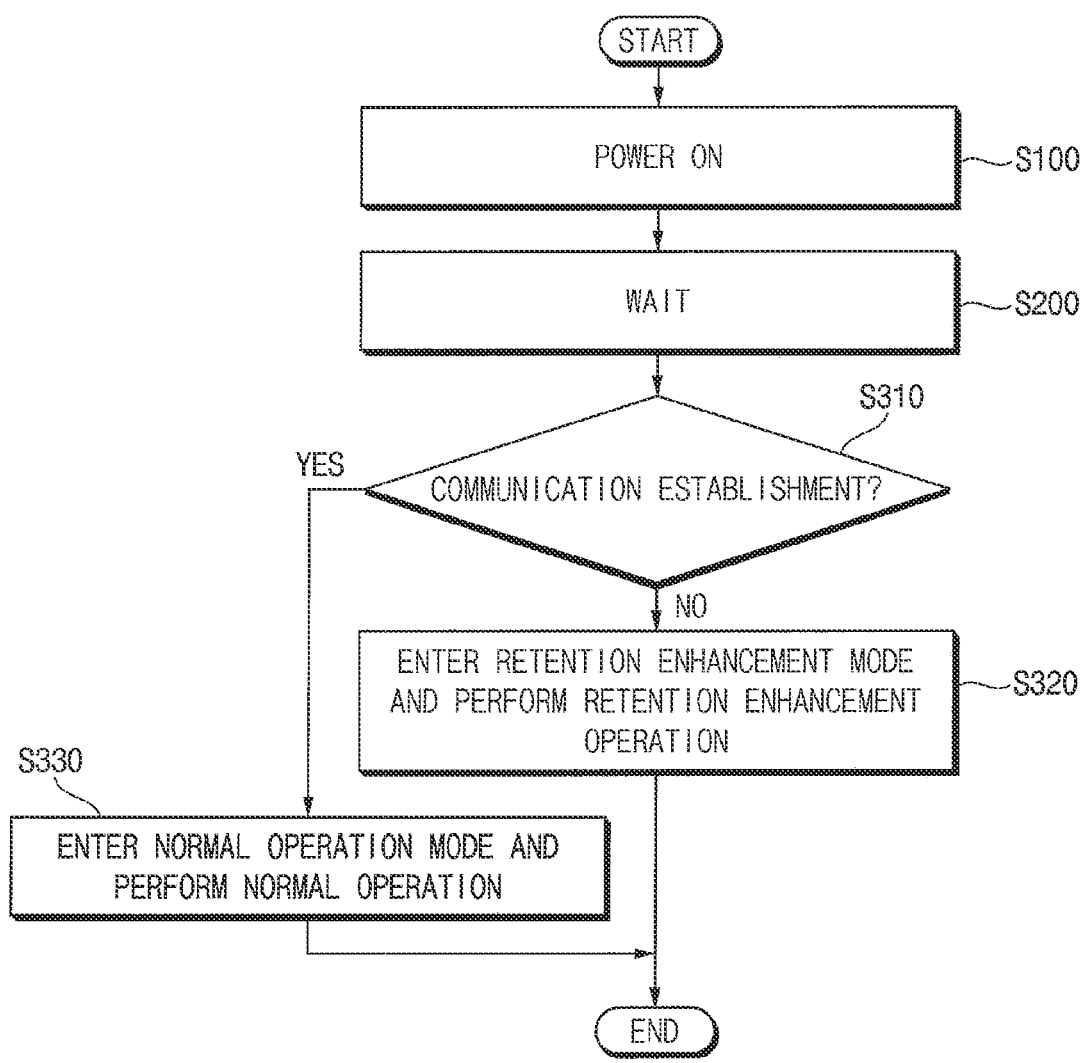
FIG. 2 is a flowchart illustrating an example of a method of operating a storage device of FIG. 1.

FIG. 2 is a flowchart illustrating an example of a method of operating the storage device of FIG. 1.

Referring to FIGS. 1 and 2, steps S100 and S200 in FIG. 2 may be substantially the same as steps S100 and S200 of FIG. 1, respectively.

In step S300, it may be determined whether the establishment of communication with the host device has been successfully completed or has failed (step S310). For example, as will be described with reference to FIG. 9, the success or failure of the establishment of communication may be determined based on the link signal.

When the establishment of communication with the host device has failed (step S310: NO), e.g., when the link signal is deactivated or disabled, the storage device may enter the retention enhancement mode, and may perform the retention enhancement operation (step S320). For example, the retention enhancement operation may include a read operation, and may further include a reprogram operation.

When the establishment of communication with the host device is successfully completed (step S310: YES), e.g., when the link signal is activated or enabled, the storage device may enter a normal operation mode, and may perform a normal operation (step S330). For example, the normal operation may include various operations performed while the storage device is driven, e.g., a read operation, a program operation, an erase operation, a reprogram operation, or the like.

In some exemplary embodiments, a first criterion associated with the reprogram operation performed in the retention enhancement mode may be different from a second criterion associated with the reprogram operation performed in the normal operation mode, which will be described with reference to FIG. 13.

Although FIG. 2 illustrates that the process is terminated after the retention enhancement operation or the normal operation is performed, exemplary embodiments are not limited thereto. For example, after the storage device enters the normal operation mode, the normal operation may be continuously performed until the external power supply voltage is deactivated. In a further example, after the storage device enters the retention enhancement mode, the retention enhancement operation may be periodically and/or repeatedly performed. In yet another example, the storage device may exit the retention enhancement mode, may enter the normal operation mode and may perform the normal operation while or after the retention enhancement operation is performed.

Figure 3:
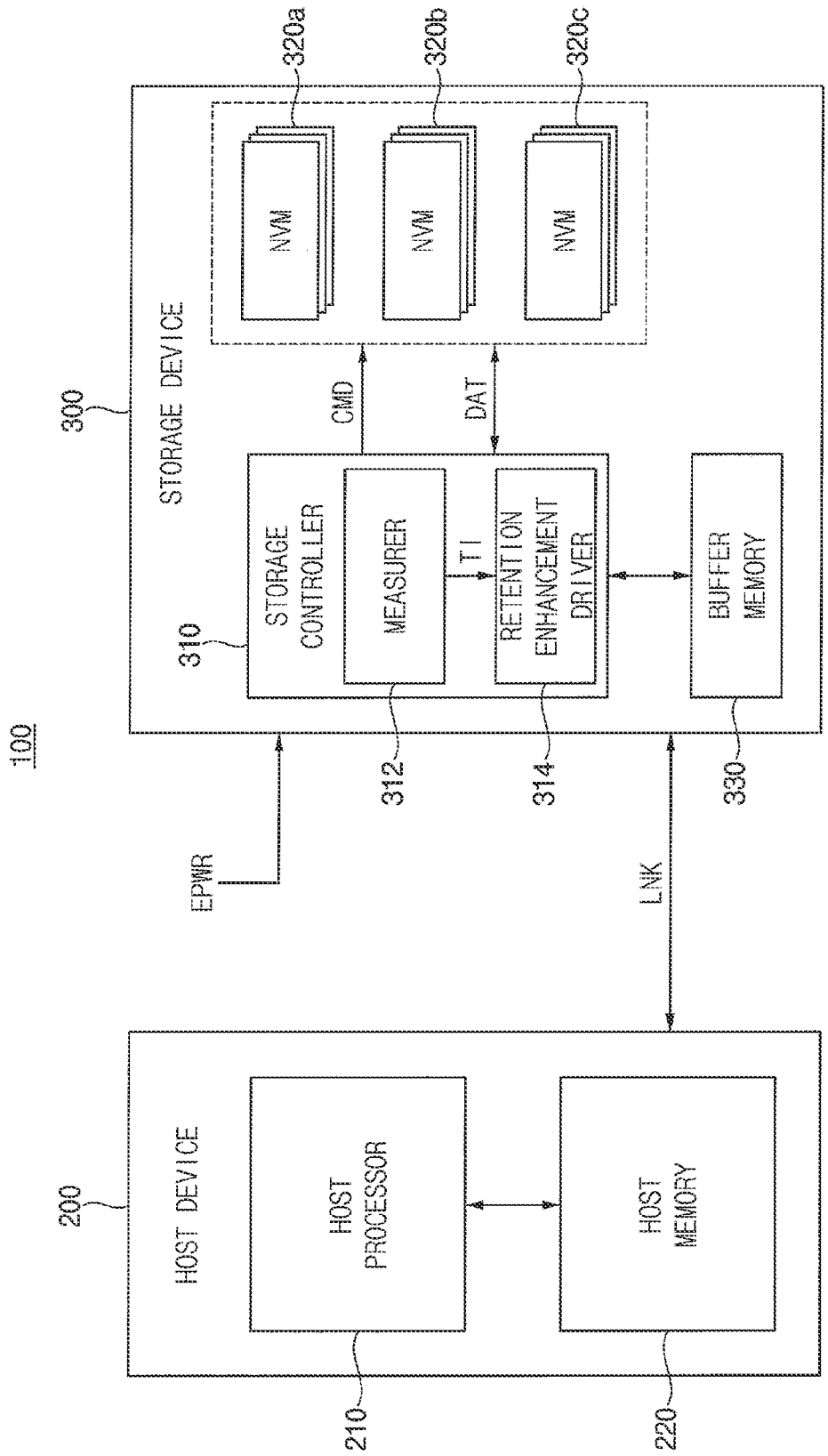
FIG. 3 is a block diagram illustrating a storage device and a storage system including the storage device according to exemplary embodiments.

FIG. 3 is a block diagram illustrating a storage device and a storage system including the storage device according to exemplary embodiments.

Referring to FIG. 3, a storage system 100 includes a host device 200 and a storage device 300.

The host device 200 controls overall operations of the storage system 100. The host device 200 may include a host processor 210 and a host memory 220.

The host processor 210 may control an operation of the host device 200. For example, the host processor 210 may execute an operating system (OS). For example, the operating system may include a file system for file management and a device driver for controlling peripheral devices including the storage device 300 at the operating system level. For example, the host processor 210 may include at least one of various processing units, e.g., a central processing unit (CPU), or the like.

The host memory 220 may store instructions and/or data that are executed and/or processed by the host processor 210. As an example, the host memory 220 may include at least one of various volatile memories, e.g., a dynamic random access memory (DRAM), or the like.

The storage device 300 is accessed by the host device 200. The storage device 300 may include a storage controller 310, a plurality of nonvolatile memories 320a, 320b and 320c, and a buffer memory 330.

The storage controller 310 may control an operation of the storage device 300. For example, the storage controller 310 may control operations of the plurality of nonvolatile memories 320a, 320b and 320c based on a command and data that are received from the host device 200.

The plurality of nonvolatile memories 320a, 320b and 320c may be controlled by the storage controller 310, and may store a plurality of data. For example, the plurality of nonvolatile memories 320a, 320b and 320c may store meta data, various user data, or the like.

In some exemplary embodiments, each of the plurality of nonvolatile memories 320a, 320b and 320c may include a NAND flash memory. In other exemplary embodiments, each of the plurality of nonvolatile memories 320a, 320b and 320c may include one of an electrically erasable programmable read only memory (EEPROM), a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), or the like.

The buffer memory 330 may store instructions and/or data that are executed and/or processed by the storage controller 310, and may temporarily store data stored in or to be stored into the plurality of nonvolatile memories 320a, 320b and 320c. For example, the buffer memory 330 may include at least one of various volatile memories, e.g., a static random access memory (SRAM), a DRAM, or the like.

The storage device 300 may perform the method of operating the storage device according to exemplary embodiments described with reference to FIG. 1. For example, the storage device 300 may be powered on based on an activation of an external power supply voltage EPWR. The external power supply voltage EPWR may be provided from the host device 200, or may be provided from a separate power supply device (not illustrated). The storage device 300 (e.g., the storage controller 310) may wait for establishment of communication with the host device 200 based on a link signal LNK between the host device 200 and the storage device 300. The storage device 300 (e.g., the storage controller 310) may perform a retention enhancement operation, without the establishment of communication with the host device 200, by entering a retention enhancement mode and by providing at least one command CMD to the nonvolatile memories 320a, 320b and 320c.

The storage controller 310 may include a measurer 312 and a retention enhancement driver 314.

The measurer 312 may obtain and provide time information TI associated with the retention enhancement mode and the retention enhancement operation. For example, as will be described with reference to FIG. 8, the time information TI may include first time information associated with an establishment of communication waiting time for the storage device 300. For example, as will be described with reference to FIG. 14, the time information TI may further include second time information associated with a retention enhancement waiting time of the storage device 300. By way of example, the measurer 312 may include a timer, a counter, or the like, for obtaining time information TI.

The retention enhancement driver 314 may control an execution of the retention enhancement operation in the retention enhancement mode. For example, as will be described with reference to FIG. 12, the retention enhancement operation may include a read operation, the command CMD provided from the storage controller 310 to the nonvolatile memories 320a, 320b and 320c may include a read command, and the data DAT exchanged between the storage controller 310 and the nonvolatile memories 320a, 320b and 320c may include read data output from the nonvolatile memories 320a, 320b and 320c based on the read command. For example, as will be described with reference to FIGS. 12 and 13, the retention enhancement operation may further include a reprogram operation, the command CMD may further include a reprogram command, and the data DAT may further include reprogram data provided to and stored in the nonvolatile memories 320a, 320b and 320c based on the reprogram command.

In some exemplary embodiments, the storage device 300 may be a solid state drive (SSD). In other exemplary embodiments, the storage device 300 may be a universal flash storage (UFS), a multi-media card (MMC) or an embedded multi-media card (eMMC). Alternatively, the storage device 300 may be one of a secure digital (SD) card, a micro SD card, a memory stick, a chip card, a universal serial bus (USB) card, a smart card, a compact flash (CF) card, or the like.

In some exemplary embodiments, the storage device 300 may be connected to the host device 200 via a block accessible interface which may include, for example, a small computer small interface (SCSI) bus, a serial attached SCSI (SAS) bus, a peripheral component interconnect express (PCIe) bus, a serial advanced technology attachment (SATA) bus, a nonvolatile memory express (NVMe) bus, a UFS bus, an eMMC bus, or the like. The storage device 300 may use a block accessible address space corresponding to an access size of the plurality of nonvolatile memories 320a, 320b and 320c to provide the block accessible interface to the host device 200, for allowing the access by units of a memory block with respect to data stored in the plurality of nonvolatile memories 320a, 320b and 320c.

In some exemplary embodiments, the storage system 100 may be any computing system, such as a personal computer (PC), a server computer, a data center, a workstation, a digital television, a set-top box, a navigation system, etc. In other exemplary embodiments, the storage system 100 may be any mobile system, such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

Figure 4:
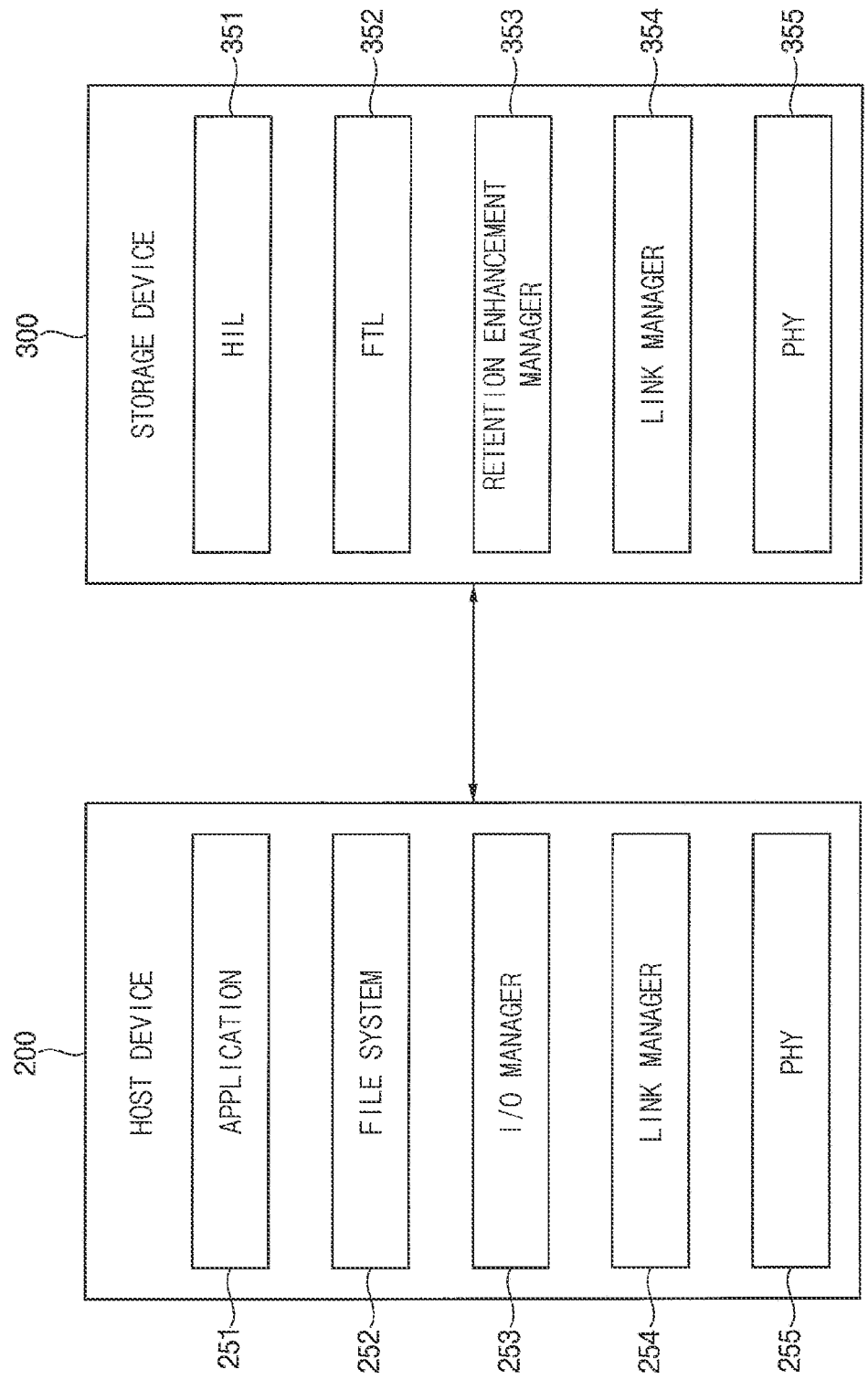
FIG. 4 is a diagram for describing an operation of a storage system according to exemplary embodiments.

FIG. 4 is a diagram for describing an operation of a storage system according to exemplary embodiments. FIG. 4 conceptually illustrates a software hierarchical structure of the host device 200 and the storage device 300 in FIG. 3.

Referring to FIG. 4, the host device 200 may include an application 251, a file system 252, an input/output (I/O) manager 253, a link manager 254 and a physical layer (PHY) 255.

The application 251 may be an application software program that is executed on an operating system. For example, the application 251 may be programmed to aid in generating, copying and deleting a file. For example, the application 251 may provide various services such as a video application, a game application, a web browser application, or the like.

The file system 252 may manage files used by the host device 200. For example, the file system 252 may manage file names, extensions, file attributes, file sizes, cluster information, or the like, of files accessed by requests from the host device 200 or applications executed by the host device 200. The file system 252 may generate, delete and manage data on a file basis.

The I/O manager 253 may manage inputs and outputs received from the application 251 and the file system 252, and may manage commands and data transmitted to the storage device 300. The link manager 254 may control connection to the storage device 300. The physical layer 255 may manage physical data communication with the storage device 300.

The application 251 and the file system 252 may be referred to as a high level, and the I/O manager 253, the link manager 254 and the physical layer 255 may be referred to as a low level.

The storage device 300 may include a host interface layer (HIL) 351, a flash translation layer (FTL) 352, a retention enhancement manager 353, a link manager 354 and a physical layer 355.

The host interface layer 351 may manage inputs, outputs, commands and data from the host device 200. The flash translation layer 352 may perform various functions, such as an address mapping operation, a wear-leveling operation, a garbage collection operation, or the like. The address mapping operation may be an operation of converting a logical address received from the host device 200 into a physical address used to actually store data in a nonvolatile memory (e.g., the nonvolatile memories 320a, 320b and 320c in FIG. 2). The wear-leveling operation may be a technique for preventing excessive deterioration of a specific block by allowing blocks of the nonvolatile memory to be uniformly used. As an example, the wear-leveling operation may be implemented using a firmware technique that balances erase counts of physical blocks. The garbage collection operation may be a technique for ensuring usable capacity in the nonvolatile memory by erasing an existing block after copying valid data of the existing block to a new block. The operation of the firmware layer may be controlled by the host interface layer 351 and the flash translation layer 352.

The retention enhancement manager 353 may manage and/or control the retention enhancement mode and the retention enhancement operation in the method of operating the storage device according to exemplary embodiments. For example, the retention enhancement manager 353 may include the measurer 312 and the retention enhancement driver 314 in FIG. 3.

The link manager 354 may control connection to the host device 200. The physical layer 355 may manage physical data communication with the host device 200. The operation of the link layer and/or the physical layer may be controlled by the link manager 354 and the physical layer 355.

The host interface layer 351 and the flash translation layer 352 may be referred to as high level, and the link manager 354 and the physical layer 355 may be referred to as low level.

Figure 5:
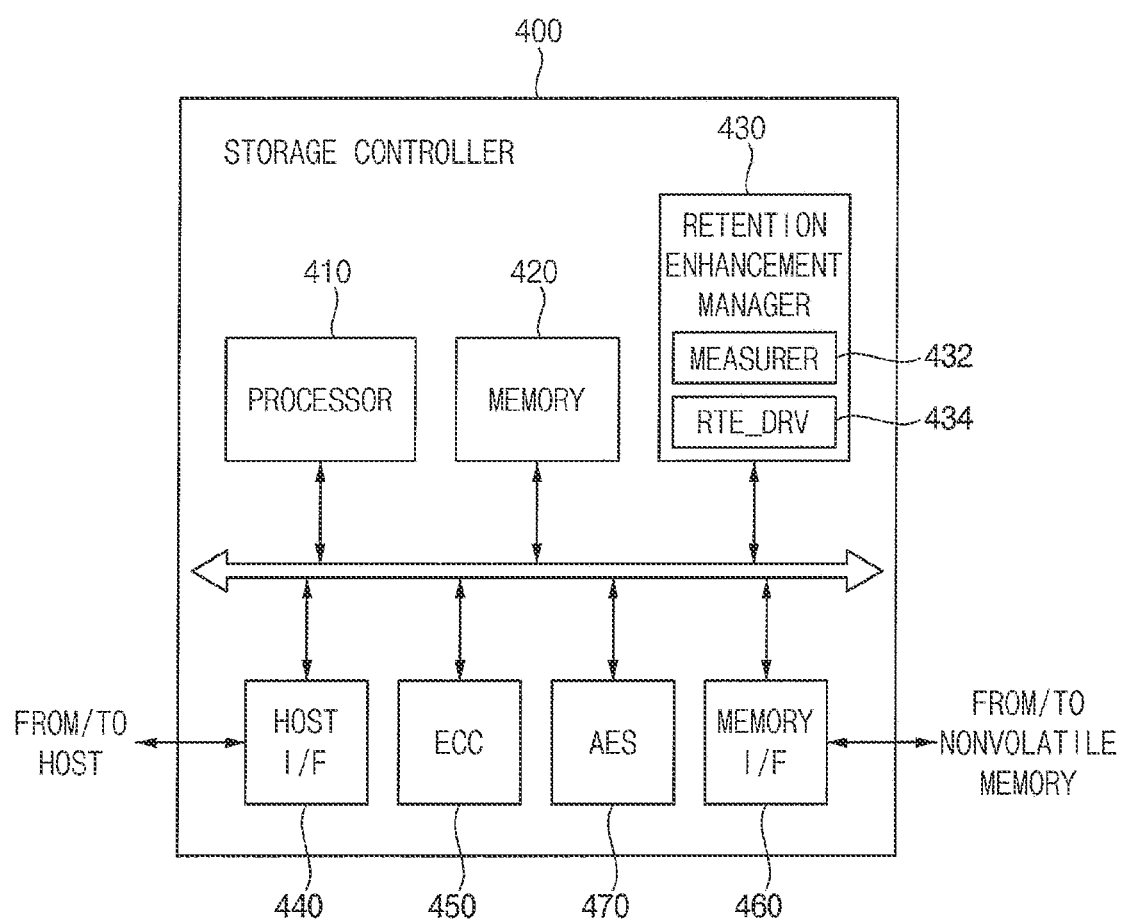
FIG. 5 is a block diagram illustrating an example of a storage controller included in a storage device according to exemplary embodiments.

FIG. 5 is a block diagram illustrating an example of a storage controller included in a storage device according to exemplary embodiments.

Referring to FIG. 5, a storage controller 400 may include a processor 410, a memory 420, a retention enhancement manager 430, a host interface 440, an error correction code (ECC) engine 450, a memory interface 460 and an advanced encryption standard (AES) engine 470.

The processor 410 may control an operation of the storage controller 400 in response to a command received via the host interface 440 from a host device (e.g., the host device 200 in FIG. 3). For example, the processor 410 may control an operation of a storage device (e.g., the storage device 300 in FIG. 3), and may control respective components by employing firmware for operating the storage device.

The memory 420 may store instructions and data executed and processed by the processor 410. For example, the memory 420 may be implemented with a volatile memory, such as a DRAM, a SRAM, a cache memory, or the like.

The retention enhancement manager 430 may manage and/or control the retention enhancement mode and the retention enhancement operation in the method of operating the storage device according to exemplary embodiments, and may include a measurer 432 and a retention enhancement driver (RTE_DRV) 434. The measurer 432 and the retention enhancement driver 434 may be substantially the same as the measurer 312 and the retention enhancement driver 314 in FIG. 3, respectively. In some exemplary embodiments, at least a part of the retention enhancement manager 430 may be implemented as hardware. For example, at least a part of the retention enhancement manager 430 may be included in a computer-based electronic system. In other exemplary embodiments, at least a part of the retention enhancement manager 430 may be implemented as instruction codes or program routines (e.g., a software program). For example, the instruction codes or the program routines may be executed by a computer-based electronic system, and may be stored in any storage device located inside or outside the computer-based electronic system.

The ECC engine 450 for error correction may perform coded modulation using a Bose-Chaudhuri-Hocquenghem (BCH) code, a low density parity check (LDPC) code, a turbo code, a Reed-Solomon code, a convolution code, a recursive systematic code (RSC), a trellis-coded modulation (TCM), a block coded modulation (BCM), etc., or may perform ECC encoding and ECC decoding using the above-described codes or other error correction codes.

The host interface 440 may provide physical connections between the host device and the storage device. The host interface 440 may provide an interface corresponding to a bus format of the host device for communication between the host device and the storage device. In some exemplary embodiments, the bus format of the host device may be a small computer system interface (SCSI) or a serial attached SCSI (SAS) interface. In other exemplary embodiments, the bus format of the host device may be a USB, a peripheral component interconnect (PCI) express (PCIe), an advanced technology attachment (ATA), a parallel ATA (PATA), a serial ATA (SATA), a nonvolatile memory (NVM) express (NVMe), etc., format.

The memory interface 460 may exchange data with a nonvolatile memory (e.g., the nonvolatile memories 320a, 320b and 320c in FIG. 3). The memory interface 460 may transfer data to the nonvolatile memory, or may receive data read from the nonvolatile memory. In some exemplary embodiments, the memory interface 460 may be connected to the nonvolatile memory via one channel. In other exemplary embodiments, the memory interface 460 may be connected to the nonvolatile memory via two or more channels. For example, the memory interface 460 may be configured to comply with a standard protocol, such as Toggle or open NAND flash interface (ONFI).

The AES engine 470 may perform at least one of an encryption operation and a decryption operation on data input to the storage controller 400 by using a symmetric-key algorithm. Although not illustrated in detail, the AES engine 470 may include an encryption module and a decryption module. For example, the encryption module and the decryption module may be implemented as separate modules. As another example, one module capable of performing both encryption and decryption operations may be implemented in the AES engine 470.

Figure 6:
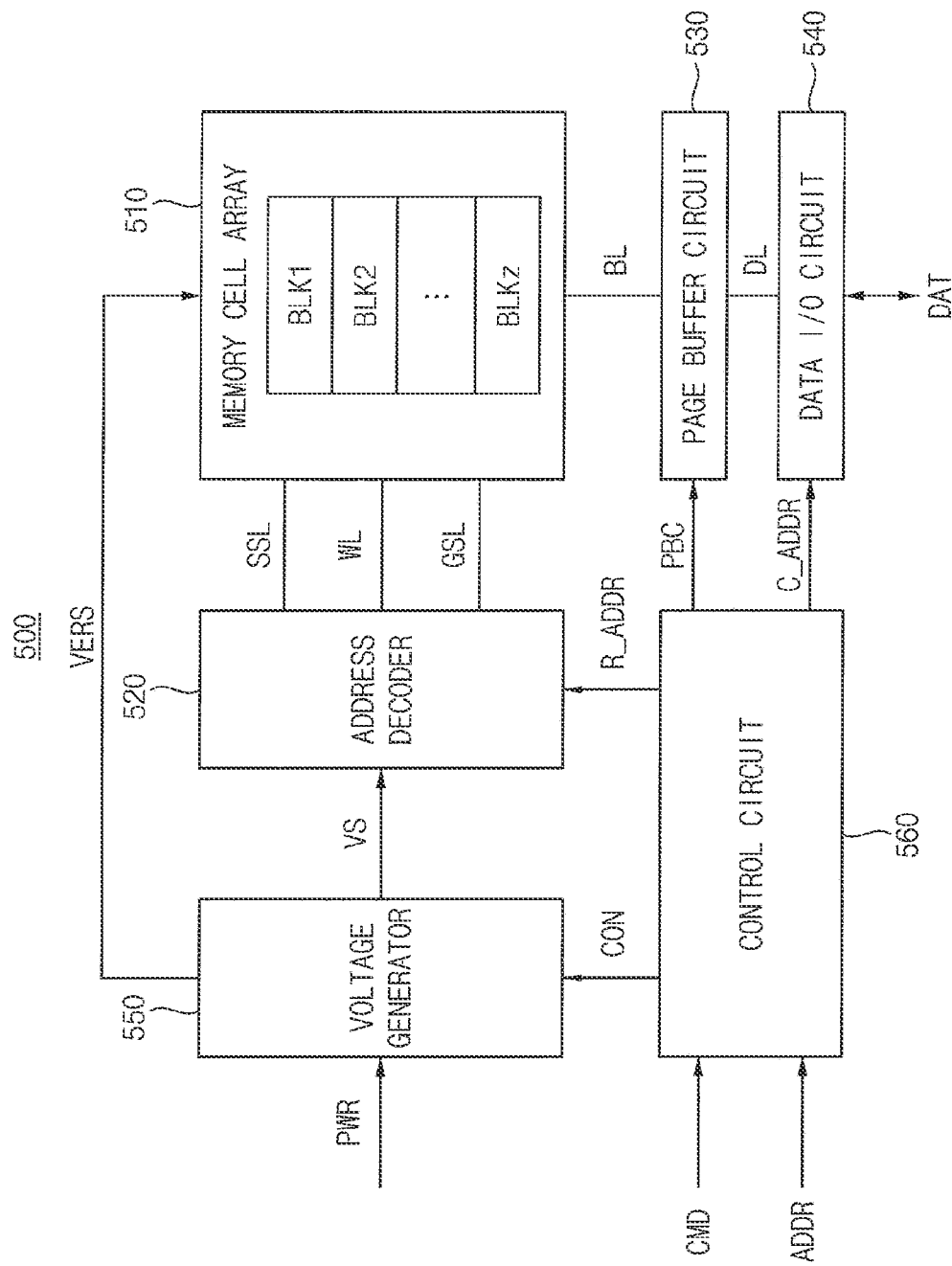
FIG. 6 is a block diagram illustrating an example of a nonvolatile memory included in a storage device according to exemplary embodiments.

FIG. 6 is a block diagram illustrating an example of a nonvolatile memory included in a storage device according to exemplary embodiments.

Referring to FIG. 6, a nonvolatile memory 500 may include a memory cell array 510, an address decoder 520, a page buffer circuit 530, a data I/O circuit 540, a voltage generator 550 and a control circuit 560.

The memory cell array 510 may be connected to the address decoder 520 via a plurality of string selection lines SSL, a plurality of wordlines WL and a plurality of ground selection lines GSL. The memory cell array 510 may be further connected to the page buffer circuit 530 via a plurality of bitlines BL. The memory cell array 510 may include a plurality of memory cells (e.g., a plurality of nonvolatile memory cells) that are connected to the plurality of wordlines WL and the plurality of bitlines BL. The memory cell array 510 may be divided into a plurality of memory blocks BLK1, BLK2, . . . , BLKz each of which includes memory cells. In addition, each of the plurality of memory blocks BLK1, BLK2, . . . , BLKz may be divided into a plurality of pages.

In some exemplary embodiments, the plurality of memory cells included in the memory cell array 510 may be arranged in a two-dimensional (2D) array structure or a three-dimensional (3D) vertical array structure. The 3D vertical array structure may include vertical cell strings that are vertically oriented such that at least one memory cell is located over another memory cell. The at least one memory cell may comprise a charge trap layer. The following patent documents, which are hereby incorporated by reference in their entirety, describe suitable configurations for memory cell arrays including a 3D vertical array structure, in which the three-dimensional memory arrays are configured as having a plurality of levels, with wordlines and/or bitlines shared between levels: U.S. Pat. Nos. 7,679,133; 8,553,466; 8,654, 587; 8,559,235; and US Pat. Pub. No. 2011/0233648.

The control circuit 560 may receive a command CMD and an address ADDR from an external origin (e.g., from the storage controller 310 in FIG. 3), and may control erasure, programming and read operations of the nonvolatile memory 500 based on the command CMD and the address ADDR. An erasure operation may include performing a sequence of erase loops, and a program operation may include performing a sequence of program loops. Each program loop may include a program operation and a program verification operation. Each erase loop may include an erase operation and an erase verification operation. The read operation may include a normal read operation and data recover read operation.

For example, the control circuit 560 may generate control signals CON, which are used for controlling the voltage generator 550, and may generate control signal PBC for controlling the page buffer circuit 530, based on the command CMD, and may generate a row address R_ADDR and a column address C_ADDR based on the address ADDR. The control circuit 560 may provide the row address R_ADDR to the address decoder 520 and may provide the column address C_ADDR to the data I/O circuit 540.

The address decoder 520 may be connected to the memory cell array 510 via the plurality of string selection lines SSL, the plurality of wordlines WL and the plurality of ground selection lines GSL.

For example, in the data erase/write/read operations, the address decoder 520 may determine at least one of the plurality of wordlines WL as a selected wordline, and may determine the rest or remainder of the plurality of wordlines WL other than the selected wordline as unselected wordlines, based on the row address R_ADDR.

In addition, in the data erase/write/read operations, the address decoder 520 may determine at least one of the plurality of string selection lines SSL as a selected string selection line, and may determine the rest or remainder of the plurality of string selection lines SSL other than the selected string selection line as unselected string selection lines, based on the row address R_ADDR.

Further, in the data erase/write/read operations, the address decoder 520 may determine at least one of the plurality of ground selection lines GSL as a selected ground selection line, and may determine the rest or remainder of the plurality of ground selection lines GSL other than the selected ground selection line as unselected ground selection lines, based on the row address R_ADDR.

The voltage generator 550 may generate voltages VS that are required for an operation of the nonvolatile memory 500 based on a power PWR and the control signals CON. The voltages VS may be applied to the plurality of string selection lines SSL, the plurality of wordlines WL and the plurality of ground selection lines GSL via the address decoder 520. In addition, the voltage generator 550 may generate an erase voltage VERS that is required for the data erase operation based on the power PWR and the control signals CON. The erase voltage VERS may be applied to the memory cell array 510 directly or via the bitline BL.

For example, during the erase operation, the voltage generator 550 may apply the erase voltage VERS to a common source line and/or the bitline BL of a memory block (e.g., a selected memory block) and may apply an erase permission voltage (e.g., a ground voltage) to all wordlines of the memory block or a portion of the wordlines via the address decoder 520. In addition, during the erase verification operation, the voltage generator 550 may apply an erase verification voltage simultaneously to all wordlines of the memory block or sequentially to the wordlines one by one.

For example, during the program operation, the voltage generator 550 may apply a program voltage to the selected wordline and may apply a program pass voltage to the unselected wordlines via the address decoder 520. In addition, during the program verification operation, the voltage generator 550 may apply a program verification voltage to the selected wordline and may apply a verification pass voltage to the unselected wordlines via the address decoder 520.

In addition, during the normal read operation, the voltage generator 550 may apply a read voltage to the selected wordline and may apply a read pass voltage to the unselected wordlines via the address decoder 520. During the data recover read operation, the voltage generator 550 may apply the read voltage to a wordline adjacent to the selected wordline and may apply a recover read voltage to the selected wordline via the address decoder 520.

The page buffer circuit 530 may be connected to the memory cell array 510 via the plurality of bitlines BL. The page buffer circuit 530 may include a plurality of page buffers. In some exemplary embodiments, each page buffer may be connected to one bitline. In other exemplary embodiments, each page buffer may be connected to two or more bitlines.

The page buffer circuit 530 may store data DAT to be programmed into the memory cell array 510 or may read data DAT sensed from the memory cell array 510. In other words, the page buffer circuit 530 may operate as a write driver or a sensing amplifier according to an operation mode of the nonvolatile memory 500.

The data I/O circuit 540 may be connected to the page buffer circuit 530 via data lines DL. The data I/O circuit 540 may provide the data DAT from the outside of the nonvolatile memory 500 to the memory cell array 510 via the page buffer circuit 530 or may provide the data DAT from the memory cell array 510 to the exterior of the nonvolatile memory 500, based on the column address C_ADDR.

Although the nonvolatile memory according to exemplary embodiments is described based on a NAND flash memory, the nonvolatile memory according to other exemplary embodiments may be any nonvolatile memory, e.g., a PRAM, a RRAM, a NFGM, a PoRAM, a MRAM, a FRAM, or the like.

Figure 7:
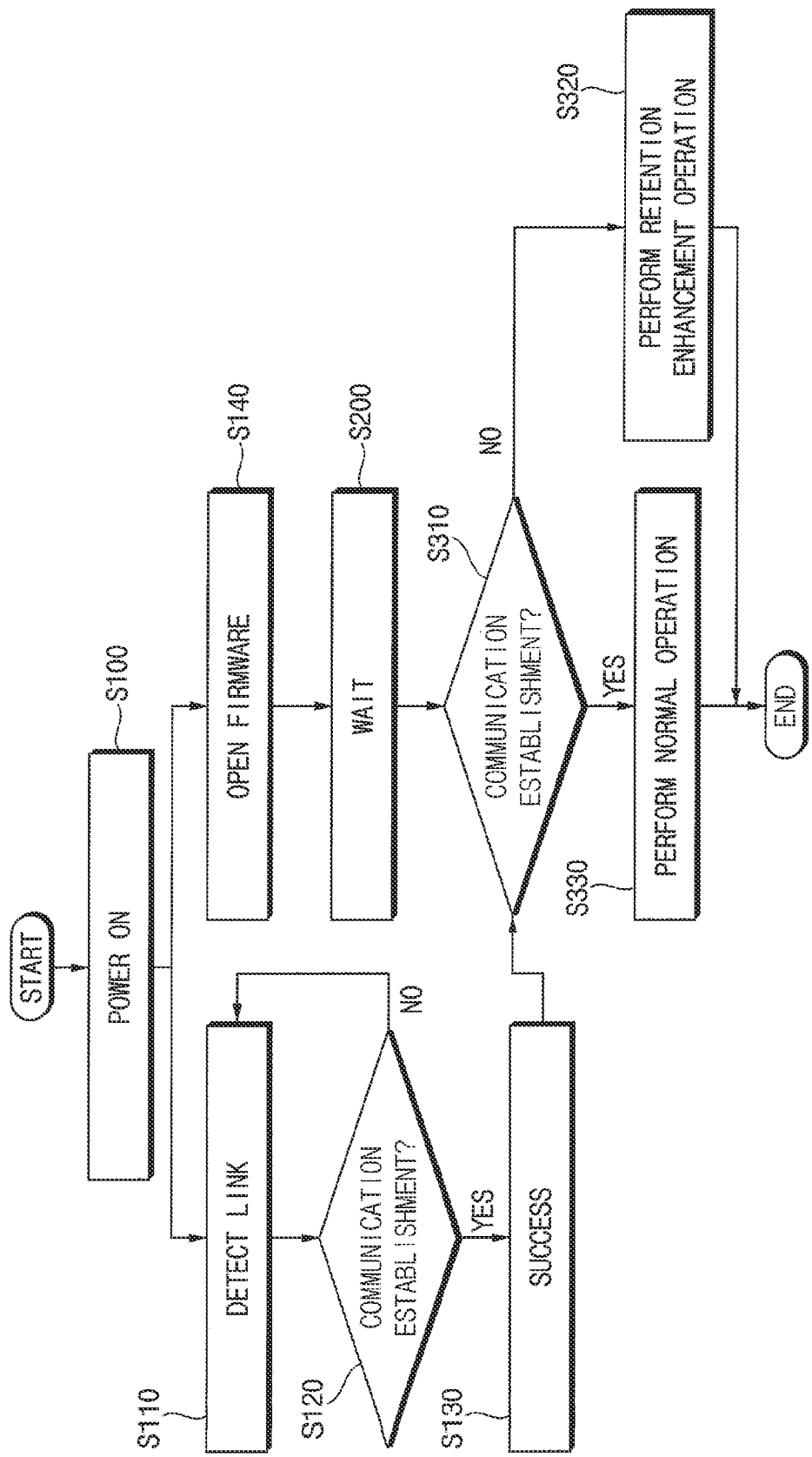
FIGS. 7 and 8 are flowcharts illustrating examples of a method of operating a storage device of FIG. 1.
Figure 8:
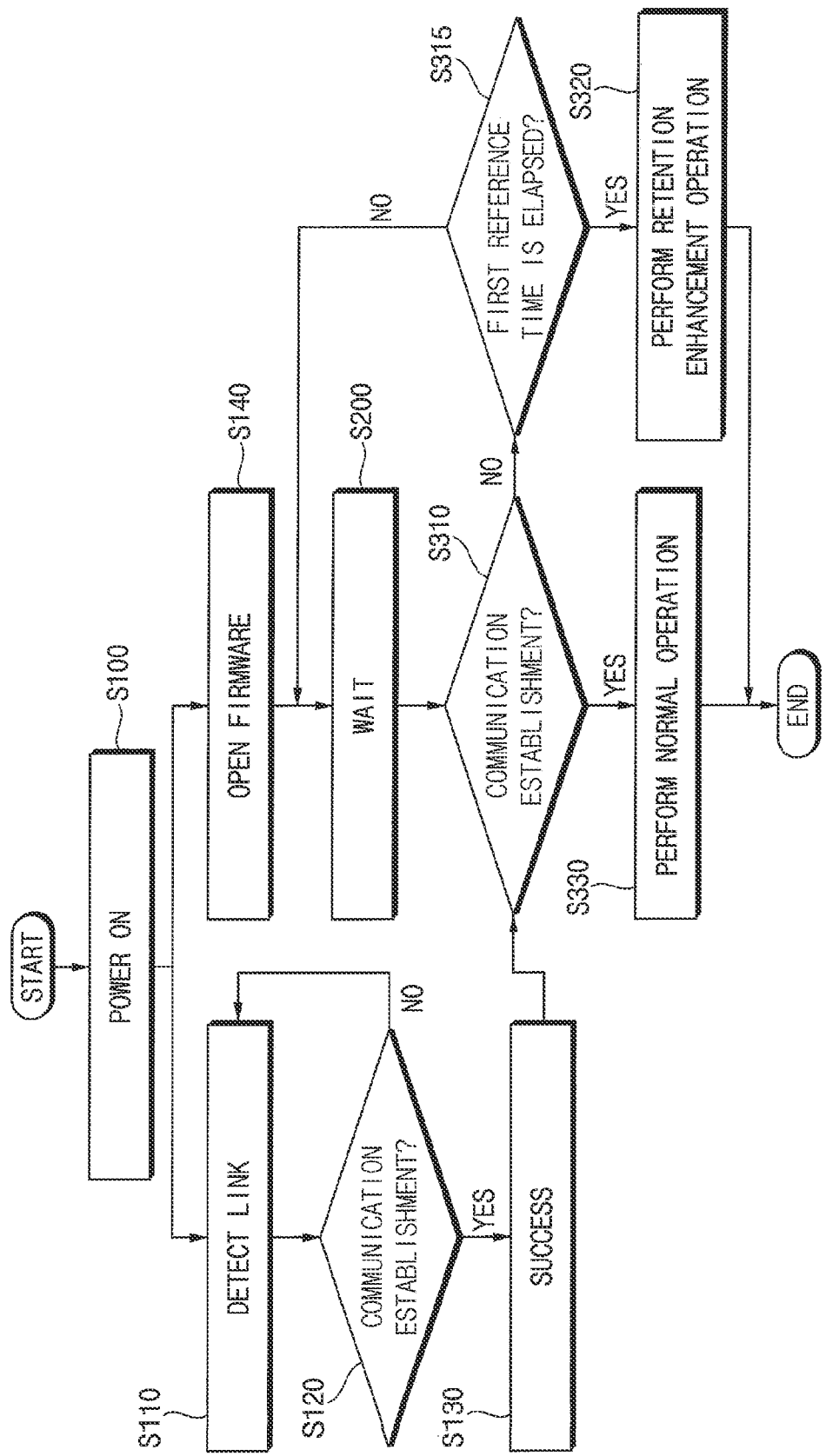

FIGS. 7 and 8 are flowcharts illustrating examples of a method of operating a storage device of FIG. 1. The descriptions repeated with FIG. 2 will be omitted as redundant.

Referring to FIGS. 1 and 7, step S100 in FIG. 7 may be substantially the same as step S100 in FIG. 1.

After step S100 is performed, steps S110, S120 and S130 on the left and steps S140, S200, S310, S320 and S330 on the right may be performed. For example, steps S110, S120 and S130 may represent the operation of the link layer and/or the physical layer for communication with the host device, for example, the operations controlled by the link manager 354 and the physical layer 355 in FIG. 4. Steps S140, S200, S310, S320 and S330 may represent the operation of the storage device and the operation of the firmware layer for the host interface, for example, the operations controlled by the host interface layer 351 and the flash translation layer 352 in FIG. 4.

The storage device (e.g., the storage controller, or the link layer and/or the physical layer) may detect a link with the host device, and may prepare and perform the establishment of communication (or setup) with the host device (step S110).

When the establishment of communication with the host device is not completed (step S120: NO), step S110 may be repeated. When the establishment of communication with the host device is successfully completed (step S120: YES), a signal representing the success of the establishment of communication may be generated and provided (step S130). For example, the link signal LNK may be activated.

The storage device (e.g., the storage controller, or the firmware layer) may open firmware (step S140), and may wait for establishment of communication with the host device (step S200). Step S200 in FIG. 7 may be substantially the same as step S200 in FIG. 1. For example, in step S200, an additional operation may not be performed, or only a minimal background operation may be performed.

Steps S310, S320 and S330 in FIG. 7 may be substantially the same as steps S310, S320 and S330 in FIG. 2, respectively. For example, in step S310, the success or failure of the establishment of communication may be determined or checked based on the signal provided by step S130. For example, step S320 may be performed by the retention enhancement driver 314 in FIG. 3.

Referring to FIGS. 1 and 8, steps S100, S110, S120, S130, S140, S200, S310, S320 and S330 in FIG. 8 may be substantially the same as steps S100, S110, S120, S130, S140, S200, S310, S320 and S330 in FIG. 7, respectively. An example that is shown in FIG. 8 may be substantially the same as the example of FIG. 7, except that step S315 is added. The descriptions repeated with FIG. 7 will be omitted as redundant.

When the establishment of communication with the host device has failed (step S310: NO), it may be determined whether an establishment of communication waiting time of the storage device becomes longer than a predetermined first reference time (step S315). For example, step S315 may be performed by the measurer 312 in FIG. 3 and the retention enhancement driver 314 in FIG. 3.

For example, the establishment of communication waiting time may start from a time point at which the external power supply voltage is activated. The measurer 312 may start to measure the establishment of communication waiting time from the time point at which the external power supply voltage is activated, and may provide the first time information associated with the establishment of communication waiting time to the retention enhancement driver 314. The retention enhancement driver 314 may compare the establishment of communication waiting time with the first reference time based on the first time information.

When the establishment of communication waiting time becomes longer than the first reference time (step S315: YES), step S320 may be performed. For example, when the link signal is still deactivated even after the first reference time has elapsed from the time point at which the external power supply voltage is activated, it may be determined that the establishment of communication with the host device has failed. When it is determined that the establishment of communication with the host device has failed, the storage device may enter the retention enhancement mode, and may perform the retention enhancement operation.

When the establishment of communication waiting time does not exceed the first reference time (step S315: NO), for example, when the establishment of communication waiting time is shorter than or equal to the first reference time, steps S200 and S310 may be repeated.

Figure 9A:
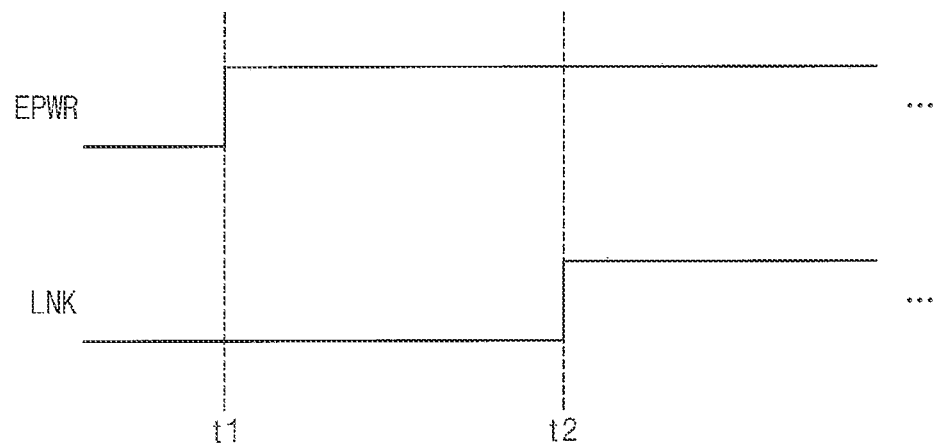
FIGS. 9A and 9B are diagrams for describing an operation of FIG. 8.
Figure 9B:
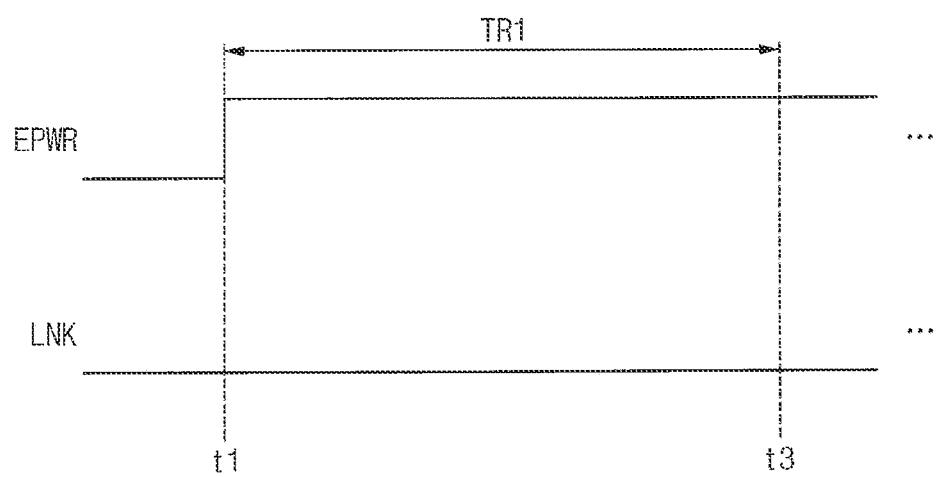

FIGS. 9A and 9B are diagrams for describing an operation of FIG. 8.

Referring to FIGS. 8 and 9A, when the external power supply voltage EPWR is activated at a first time point t1, and when the establishment of communication is successfully completed and the link signal LNK is activated at a second time point t2, the storage device may enter the normal operation mode and may perform the normal operation, as in step S330.

Referring to FIGS. 8 and 9B, when the link signal LNK is still deactivated even after a third time point t3 at which a first reference time TR1 is elapsed from the first time point t1 at which the external power supply voltage EPWR is activated, it may be determined that the establishment of communication has failed, and the storage device may enter the retention enhancement mode and may perform the retention enhancement operation, as in step S320.

FIGS. 10A, 10B, 10C, 10D and 10E are diagrams for describing an establishment of communication associated with a method of operating a storage device according to exemplary embodiments.

Referring to FIGS. 10A, 10B, 10C and 10D, examples where an interface between a host device (e.g., the host device 200 in FIG. 3) and a storage device (e.g., the storage device 300 in FIG. 3) is implemented based on a serial attached SCSI (SAS) are illustrated.

In FIGS. 10A, 10B, 10C and 10D, "PHY_A" represents the host device 200 (e.g., the physical layer 255 included in the host device 200), and "PHY_B" represents the storage device 300 (e.g., the physical layer 355 included in the storage device 300). "PHY_A_TX/PHY_B_RX" represents a signal transmission from the host device 200 to the storage device 300, and "PHY_A_RX/PHY_B_TX" represents a signal transmission from the storage device 300 to the host device 200.

Figure 10A:
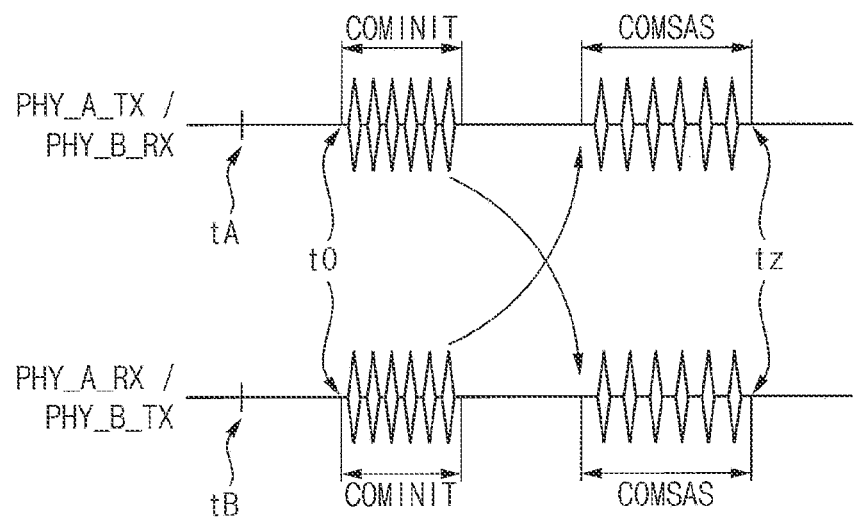
FIGS. 10A, 10B, 10C, 10D and 10E are diagrams for describing an establishment of communication associated with a method of operating a storage device according to exemplary embodiments.
Figure 10B:
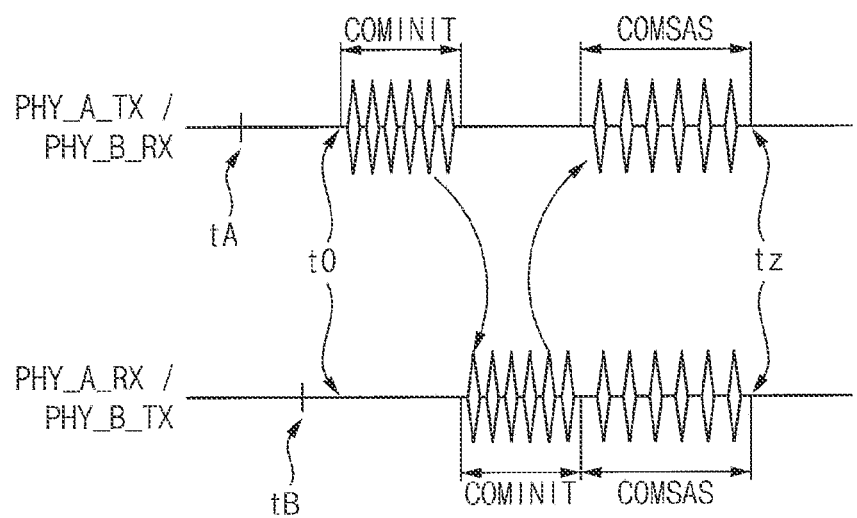
Figure 10C:
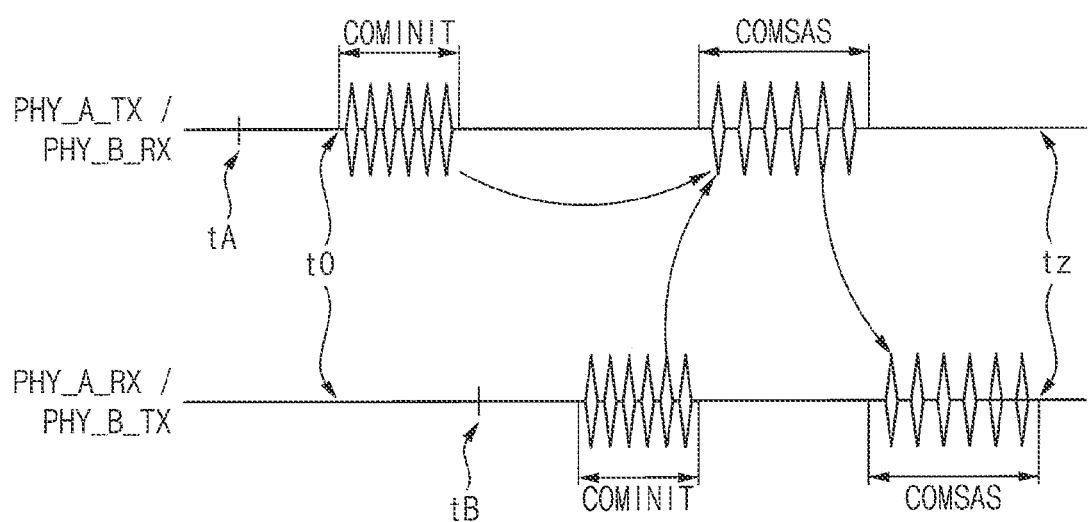
Figure 10D:
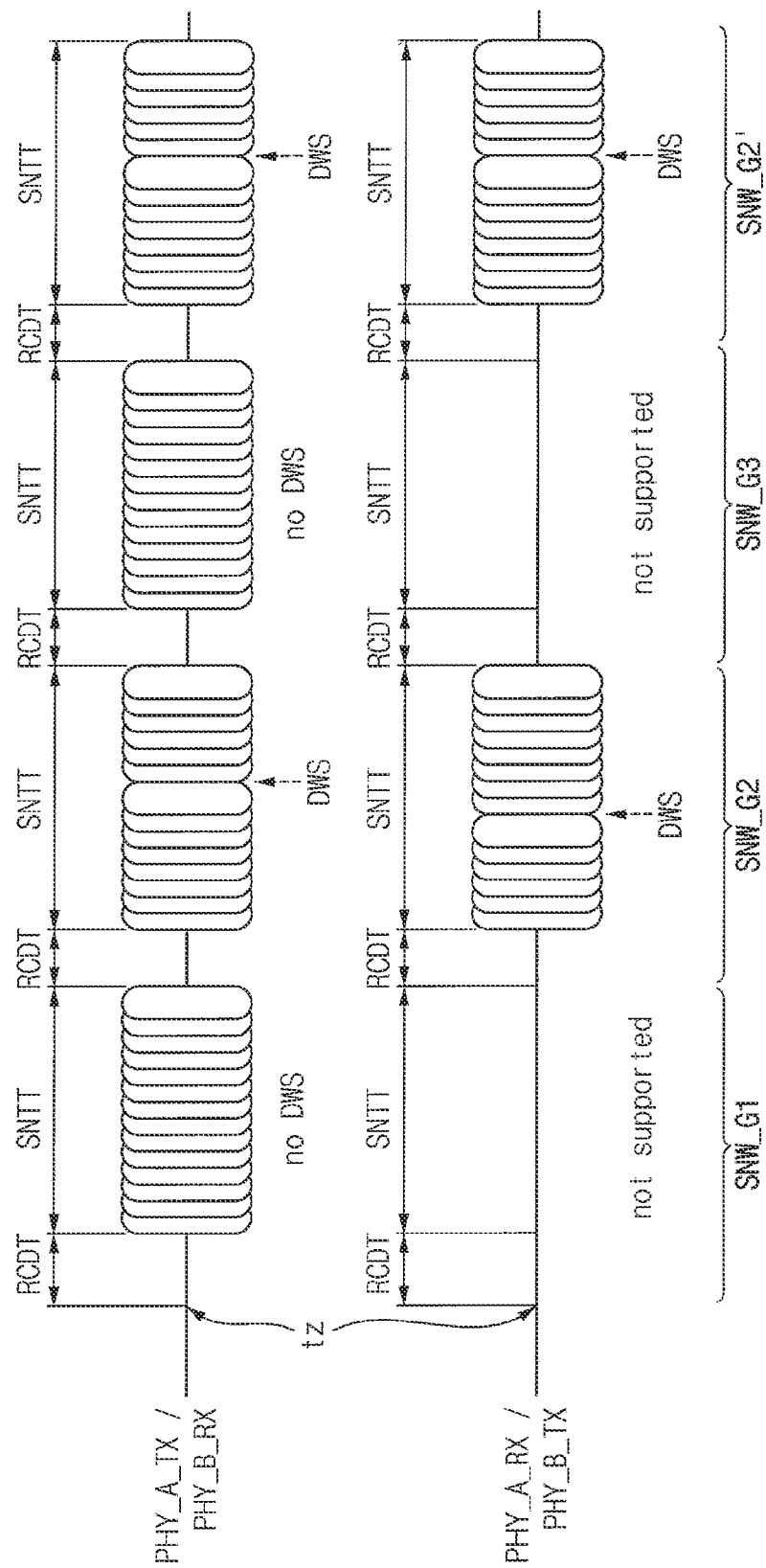

In a SAS interface, a PHY reset sequence may include an out of band (OOB) sequence using an OOB signal and a speed negotiation sequence. FIGS. 10A, 10B and 10C illustrate the OOB sequence, and FIG. 10D illustrates the speed negotiation sequence.

The OOB signal may include an initialization signal "COMINIT" and a SAS-specific signal "COMSAS". In the OOB sequence, "COMINIT" and "COMSAS" may be sequentially transmitted. The host device 200 may sequentially transmit "COMINIT" and "COMSAS" to the storage device 300, and the storage device 300 may also sequentially transmit "COMINIT" and "COMSAS" to the host device 200.

For example, to initiate the OOB sequence, a transmitting end (e.g., the host device 200) may transmit "COMINIT". When a receiving end (e.g., the storage device 300) receives "COMINIT", one of the following may be performed: a) if the receiving end has not yet transmitted "COMINIT", the receiving end transmits "COMINIT" followed by a "COMSAS"; or b) if the receiving end has transmitted "COMINIT", the receiving end transmits "COMSAS". The transmitting end may transmit "COMSAS" after transmitting "COMINIT". When "COMSAS" is transmitted and successfully received, the OOB sequence is completed, and then the speed negotiation sequence may be initiated.

FIG. 10A illustrates an example where the host device 200 and the storage device 300 initiate the OOB sequence substantially simultaneously. FIG. 10B illustrates an example where the host device 200 initiates the OOB sequence before the storage device 300 initiates the OOB sequence. FIG. 10C illustrates an example where the host device 200 initiates the OOB sequence before the storage device 300 is powered on. In FIGS. 10A, 10B and 10C, time to may represent a time point at which the host device 200 is powered on, time tB may represent a time point at which the storage device 300 is powered on, time tO may represent a time point at which the OOB sequence is initiated, and time tz may represent a time point at which the 00B sequence is completed and the speed negotiation sequence is initiated.

The speed negotiation sequence may be a peer-to-peer negotiation technique that does not assume initiator and target (e.g., host and device) roles, and may consist of a set of speed negotiation windows for each physical link rate. A length of the speed negotiation sequence may be determined by the number of physical link rates supported by the host device 200 and the storage device 300.

Each speed negotiation window may include "RCDT" and "SNTT". "RCDT" may be an abbreviation of rate change delay time, and may represent a time interval during which D.C. idle is transmitted. The D.C. idle may represent a differential signal level that is nominally 0V. "SNTT" may be an abbreviation of speed negotiation transmit time, and may represent a time interval during which ALIGN(0) or ALIGN(1) is transmitted at each physical link rate. If a specific physical link rate is supported, the ALIGNs may be transmitted during "SNTT". If a specific physical link rate is not supported, the D.C. idle may be transmitted.

FIG. 10D illustrates the speed negotiation sequence when the host device 200 supports G1, G2 and G3 link rates and the storage device 300 supports only the G2 link rate. In FIG. 10D, time tz may represent a time point at which the speed negotiation sequence is initiated.

In a speed negotiation window SNW_G1, the storage device 300 may not support the G1 link rate, and "DWS" may not exist in "SNTT" of the host device 200. "DWS" may represent a dword synchronization, and while the dword synchronization is lost, data stream may be invalid. In a speed negotiation window SNW_G2, the host device 200 and the storage device 300 may support the G2 link rate, "DWS" may exist in the "SNTT" of the host device 200 and "SNTT" of the storage device 300, but they may not be aligned with each other. In a speed negotiation window SNW_G3, the storage device 300 may not support the G3 link rate, and "DWS" may not exist in "SNTT" of the host device 200. In a final speed negotiation window SNW_G2', the host device 200 and the storage device 300 may select the G2 link rate and may align "DWS", so that the speed negotiation sequence may be completed.

When the speed negotiation sequence is completed, the establishment of communication between the host device 200 and the storage device 300 may be successfully completed, and the success of the establishment of communication may be notified, such as by activating a link signal or setting a flag.

Figure 10E:
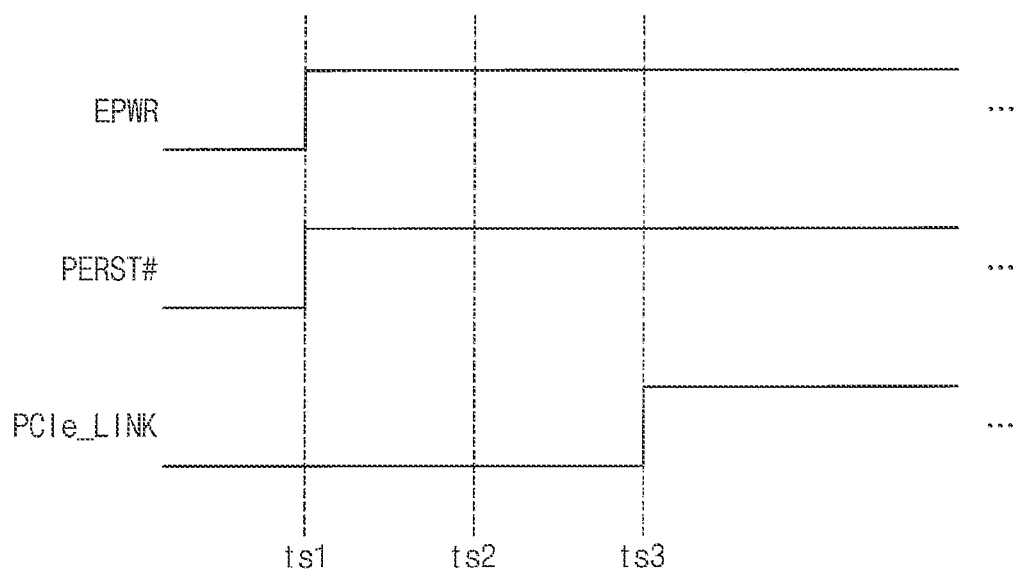

Referring to FIG. 10E, an example where an interface between a host device (e.g., the host device 200 in FIG. 3) and a storage device (e.g., the storage device 300 in FIG. 3) is implemented based on a peripheral component interconnect express (PCIe) is illustrated.

The host device 200 and the storage device 300 may exchange a plurality of configuration control signals. For example, the plurality of configuration control signals CCON may include a reset signal PERST #and a link signal PCIe_LINK. For example, the reset signal PERST #may be a signal provided from the host device 200 to the storage device 300, and may be referred to as a PCIe reset signal. For example, the host device 200 and the storage device 300 may be connected to each other through a physical connection, which is referred to as a link, and may exchange data through the link. The link signal PCIe_LINK may be a signal representing whether such connection between the host device 200 and the storage device 300 through the link is completed, e.g., whether the establishment of communication between the host device 200 and the storage controller 310 is completed.

In an initial operation time, at time ts1, the external power supply voltage EPWR may be activated, and thus power may start to be supplied to the storage device 300 (e.g., to the storage controller 310 in FIG. 3). After that, at time ts2, the reset signal PERST #may be activated (e.g., de-assertion), and thus the storage controller 310 included in the storage device 300 may be initialized and/or reset. For example, the reset signal PERST #may be used to represent when the power supply is stable and is within a predetermined voltage tolerance, and a status system and other logics in the storage controller 310 may be initialized after the power supply is stabilized. After that, at time ts3, the link signal PCIe_LINK may be activated, and thus the establishment of communication between the host device 200 and the storage device 300 (e.g., the storage controller 310) may be completed (e.g., link-up). In other words, at time ts3, the establishment of communication between the host device 200 and the storage device 300 may be successfully completed, and the success of the communication connection may be notified based on the link signal PCIe_LINK.

However, exemplary embodiments are not limited thereto, and the interface between the host device 200 and the storage device 300 may be implemented based on various other schemes.

Figure 11:
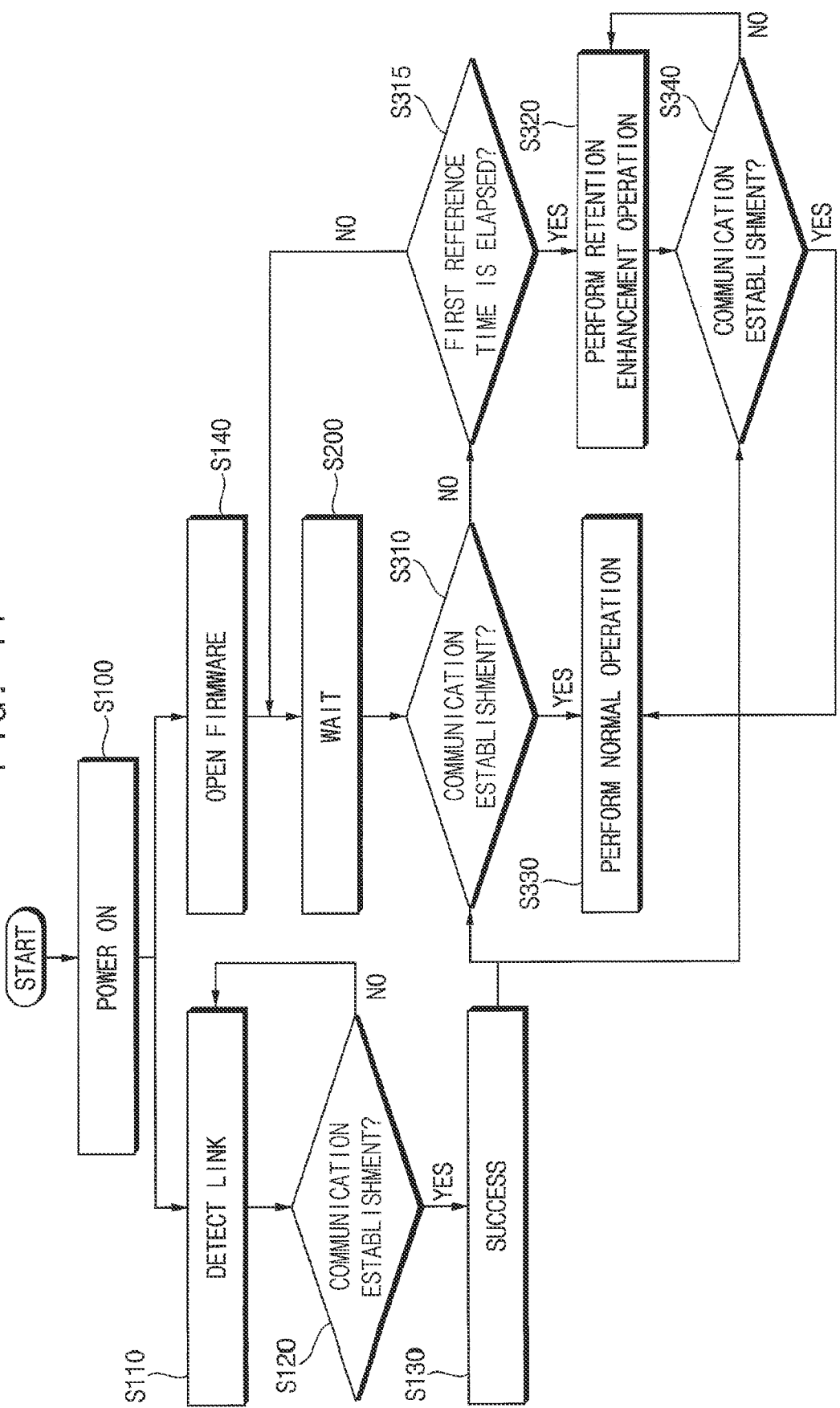
FIG. 11 is a flowchart illustrating an example of a method of operating a storage device of FIG. 1.

FIG. 11 is a flowchart illustrating an example of a method of operating a storage device of FIG. 1. The descriptions repeated with FIGS. 2, 7 and 8 will be omitted as redundant.

Referring to FIGS. 1 and 11, steps S100, S110, S120, S130, S140, S200, S310, S315, S320 and S330 in FIG. 11 may be substantially the same as steps S100, S110, S120, S130, S140, S200, S310, S315, S320 and S330 in FIG. 8, respectively. An example of FIG. 11 may be substantially the same as the example of FIG. 8, except that step S340 is added.

While the storage device enters the retention enhancement mode and performs the retention enhancement operation, and/or after the retention enhancement operation is performed in the retention enhancement mode, it may be determined whether the establishment of communication with the host device has been successfully completed (step S340). Step S340 may be substantially the same as step S310.

When the establishment of communication with the host device is successfully completed while the storage device enters the retention enhancement mode and performs the retention enhancement operation and/or after the retention enhancement operation is performed in the retention enhancement mode (step S340: YES), the storage device may stop the retention enhancement operation and may exit the retention enhancement mode, and step S330 may be performed. For example, when the link signal is activated while the storage device enters the retention enhancement mode and performs the retention enhancement operation and/or after the retention enhancement operation is performed in the retention enhancement mode, the storage device may determine that the establishment of communication with the host device is successfully completed. When the establishment of communication with the host device is successfully completed, the storage device may stop the retention enhancement operation and may exit the retention enhancement mode. When the storage device exits the retention enhancement mode, the storage device may enter the normal operation mode and may perform the normal operation.

When the establishment of communication with the host device has still failed (step S340: NO), step S320 may be repeated.

Although not illustrated in detail, steps S315 in FIGS. 8 and 11 and/or step S340 in FIG. 11 may be added to the example of FIG. 2, according to exemplary embodiments.

Figure 12:
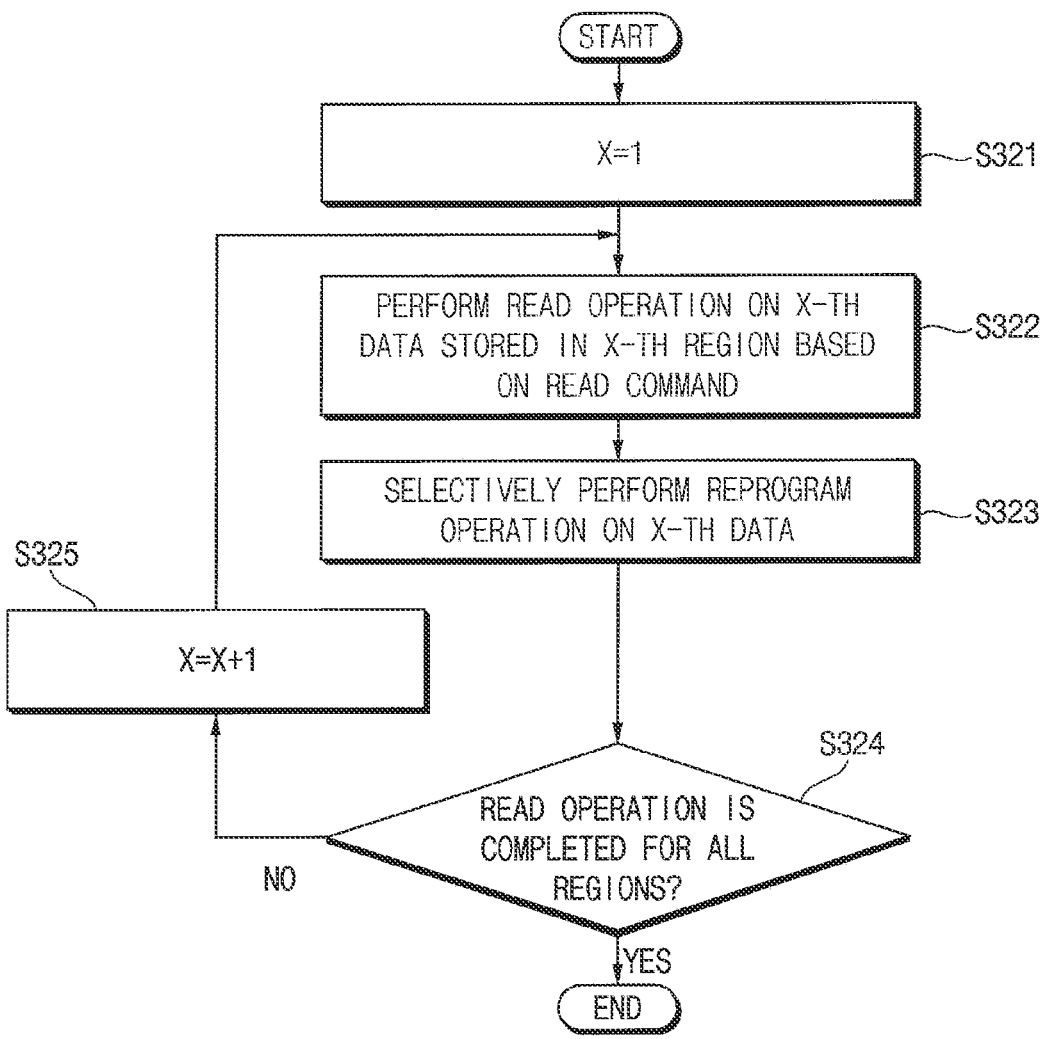
FIG. 12 is a flowchart illustrating an example of performing a retention enhancement operation in FIG. 2.

FIG. 12 is a flowchart illustrating an example of performing a retention enhancement operation in FIG. 2.

Referring to FIGS. 2 and 12, when performing the retention enhancement operation in the retention enhancement mode (step S320), the nonvolatile memory may include a plurality of regions (or storage regions), and the retention enhancement operation may be sequentially performed on the plurality of regions. For example, the plurality of regions may include first to N-th regions, where N is a natural number greater than or equal to two, and each region may include at least one page and/or at least one memory block.

First, a number X may be set to one (step S321). Based on the read command, a read operation may be performed on X-th data stored in X-th region (step S322). A reprogram operation may be selectively performed on the X-th data (step S323). When the read operation is not completed on all of the plurality of regions (step S324: NO), e.g., when X<N, X may be increased by one (step S325), and steps S322 and S323 may be repeated. When the read operation is completed on all of the plurality of regions (step S324: YES), e.g., when X=N, the retention enhancement operation may be finished or completed. For example, steps S321, S322, S323, S324 and S325 may be performed by the retention enhancement driver 314 in FIG. 3.

For example, steps S322 and S323 may be performed on the first region and first data stored in the first region, and then steps S322 and S323 may be performed on a second region and second data stored in the second region, and then steps S322 and S323 may be performed on the N-th region and N-th data stored in the N-th region. For example, steps S321 and S325 may be described as an operation of setting and/or changing addresses for the plurality of regions.

Figure 13:
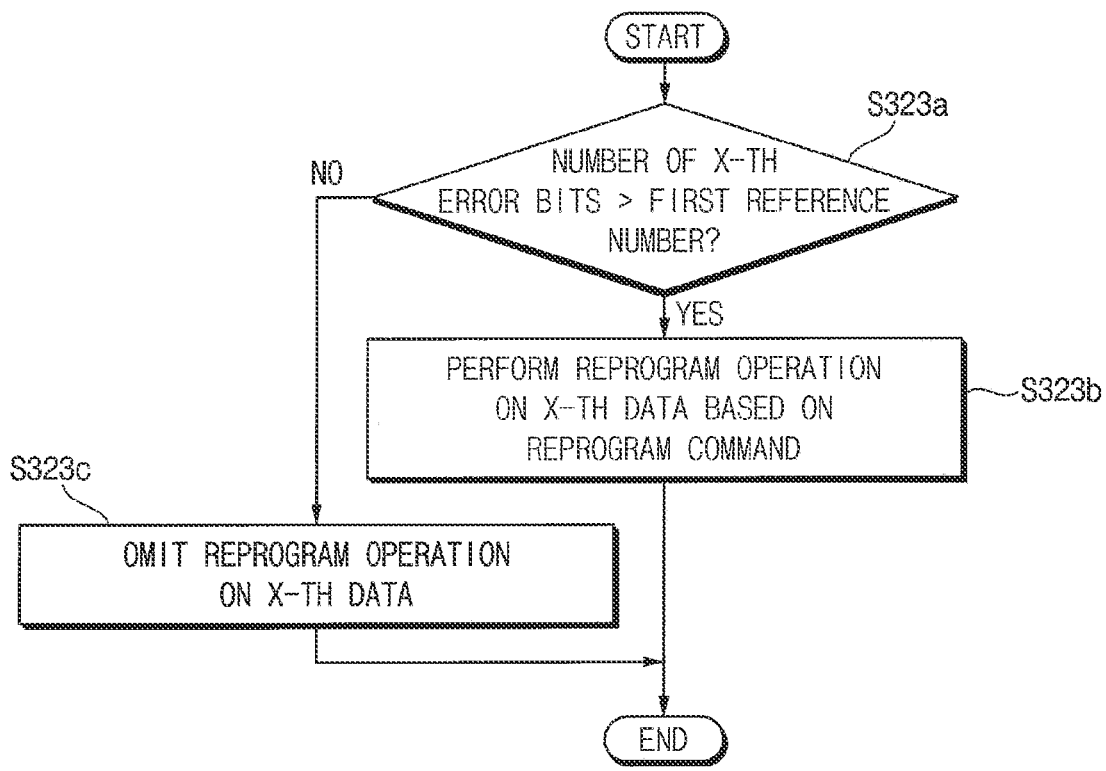
FIG. 13 is a flowchart illustrating an example of selectively performing a reprogram operation in FIG. 12.

FIG. 13 is a flowchart illustrating an example of selectively performing a reprogram operation in FIG. 12.

Referring to FIGS. 12 and 13, when selectively performing the reprogram operation on the X-th data (step S323), the number (or quantity) of X-th error bits included in the X-th data may be compared with a predetermined first reference number (step S323a).

When the number of the X-th error bits is greater than the first reference number (step S323a: YES), the reprogram operation may be performed on the X-th data based on a reprogram command (step S323b). For example, the X-th data may be reprogrammed in a region different from the X-th region.

When the number of the X-th error bits is less than or equal to the first reference number (step S323a: NO), the reprogram operation may be omitted on the X-th data (step S323c).

In some exemplary embodiments, the first reference number may be changeable. The first reference number may represent a criterion or condition for determining whether the X-th data is degraded or has deteriorated while the retention enhancement operation is performed in the retention enhancement mode. For example, the first reference number may be changed based on a user setting signal.

In some exemplary embodiments, the first reference number may be less than a second reference number that represent a criterion or condition for determining whether the X-th data is degraded or deteriorated while the normal operation is performed in the normal operation mode. For example, when the second reference number is K, the first reference number may be (K−Y), where K is a natural number and Y is a natural number less than K. In other words, the criterion for determining whether data is degraded in the retention enhancement mode (or the retention enhancement operation) may be higher than the criterion for determining whether data has degraded in the normal operation mode (or the normal operation).

In a conventional storage device, slow-read such as a background media scan or a patrol read is performed to ensure the power-on retention characteristic, and it takes a relatively long time to search the entire regions of the storage device. In contrast, in the retention enhancement operation performed by the storage device according to exemplary embodiments, intensive-read may be performed on data regions requiring integrity guarantee, and it may take a relatively short time to search the entire regions of the storage device.

Figure 14:
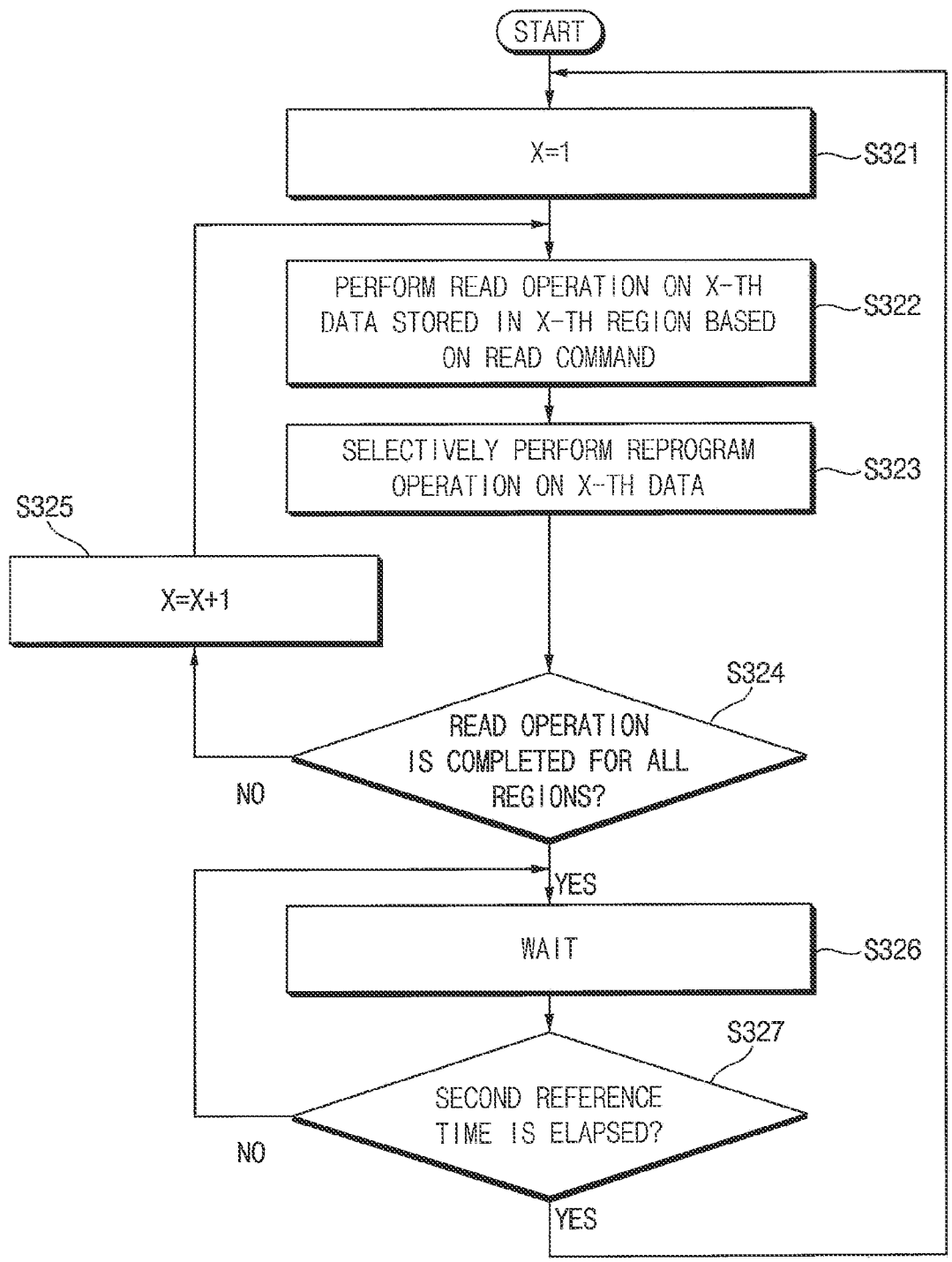
FIG. 14 is a flowchart illustrating an example of performing a retention enhancement operation in FIG. 2.

FIG. 14 is a flowchart illustrating an example of performing a retention enhancement operation in FIG. 2. The descriptions repeated with FIG. 12 will be omitted.

Referring to FIGS. 2 and 14, when performing the retention enhancement operation in the retention enhancement mode (step S320), steps S321, S322, S323, S324 and S325 in FIG. 14 may be substantially the same as steps S321, S322, S323, S324 and S325 in FIG. 12, respectively.

When the read operation is completed on all of the plurality of regions (step S324: YES), the storage device may wait in the retention enhancement mode by finishing the retention enhancement operation (step S326). That is to say, the storage device may wait in an idle state.

It may be determined whether a retention enhancement waiting time of the storage device becomes longer than a predetermined second reference time (step S327). For example, step S327 may be performed by the measurer 312 in FIG. 3 and the retention enhancement driver 314 in FIG. 3.

For example, the retention enhancement waiting time may start from a time point at which the retention enhancement operation has previously finished. The measurer 312 may start to measure the retention enhancement waiting time from the time point at which the retention enhancement operation has previously completed, and may provide the second time information associated with the retention enhancement waiting time to the retention enhancement driver 314. The retention enhancement driver 314 may compare the retention enhancement waiting time with the second reference time based on the second time information. The second reference time may be referred to as a retention enhancement restart time or simply a restart time.

When the retention enhancement waiting time becomes longer than the second reference time (step S327: YES), the storage device may perform the retention enhancement operation again. In other words, steps S321, S322, S323, S324 and S325 may be performed again.

When the retention enhancement waiting time does not exceed the second reference time (step S327: NO), e.g., when the retention enhancement waiting time is shorter than or equal to the second reference time, step S326 may be repeated.

In some exemplary embodiments, the second reference time may be determined based on a retention characteristic guarantee period of the storage device. For example, the second reference time may be shorter than the retention characteristic guarantee period. For example, when the retention characteristic guarantee period is J, the second reference time may be (J−Z), where J is a positive real number and Z is a positive real number less than J.

In some exemplary embodiments, the second reference time may be longer than the first reference time described with reference to FIG. 8.

As will be appreciated by those skilled in the art, the inventive concept may be embodied as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain or store a program for use by or in connection with an instruction execution system, apparatus, or device. For example, the computer readable medium may be a non-transitory computer readable medium.

Figure 15:
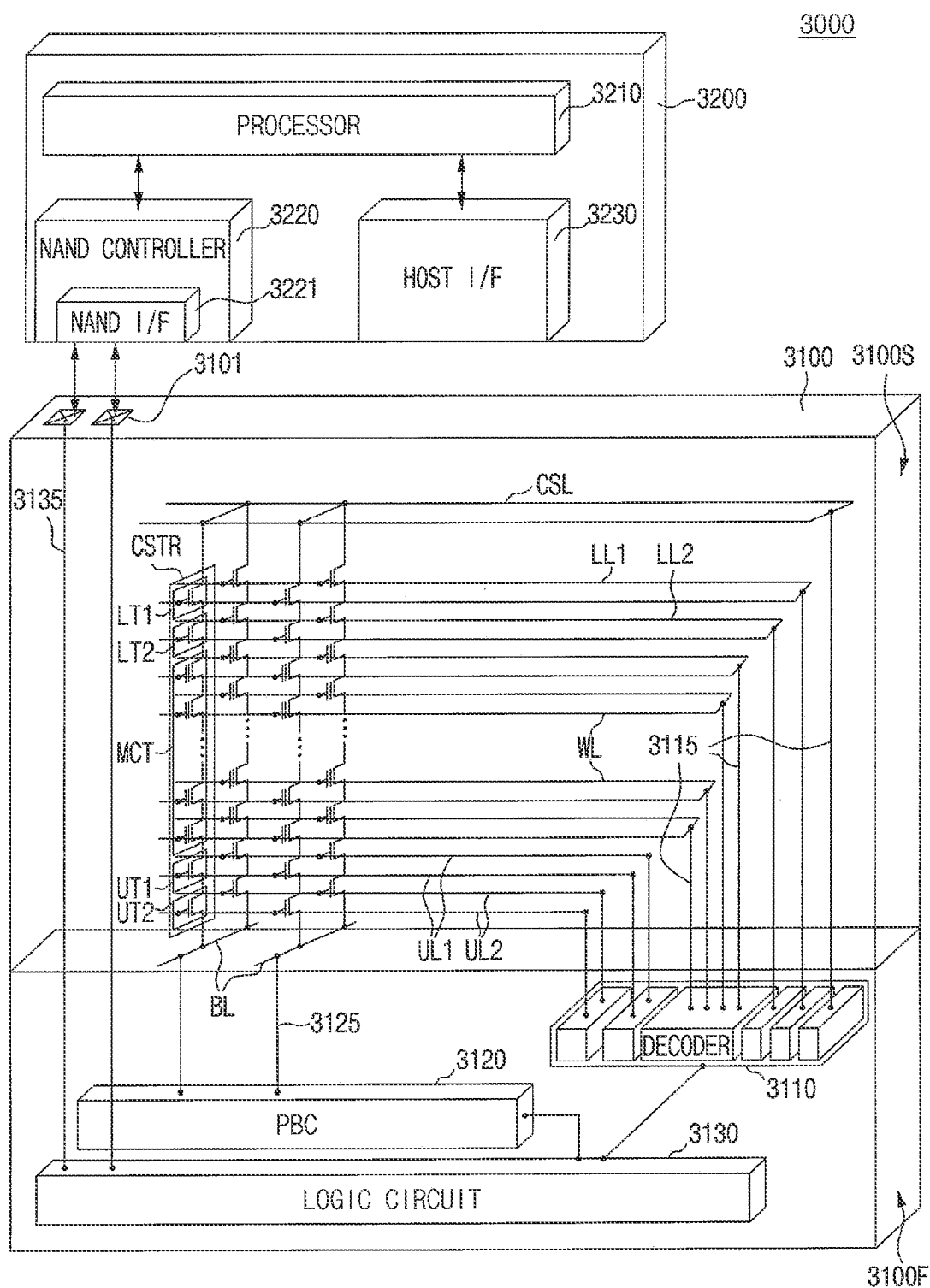
FIG. 15 is a block diagram illustrating an electronic system including a storage device according to exemplary embodiments.

FIG. 15 is a block diagram illustrating an electronic system including a storage device according to exemplary embodiments.

Referring to FIG. 15, an electronic system 3000 may include a semiconductor device 3100 and a controller 3200 electrically connected to the semiconductor device 3100. The electronic system 3000 may be a storage device including one or a plurality of semiconductor devices 3100 or an electronic device including the storage device. For example, the electronic system 3000 may be a solid state drive (SSD) device, a universal serial bus (USB), a computing system, a medical device, or a communication device that may include one or a plurality of semiconductor devices 3100.

The semiconductor device 3100 may be a memory device, for example, the nonvolatile memory described with reference to FIG. 6. The semiconductor device 3100 may include a first structure 3100F and a second structure 3100S on the first structure 3100F. The first structure 3100F may be a peripheral circuit structure including a decoder circuit 3110, a page buffer circuit 3120, and a logic circuit 3130. The second structure 3100S may be a memory cell structure including bitlines BL, a common source line CSL, wordlines WL, first and second upper gate lines UL1 and UL2, first and second lower gate lines LL1 and LL2, and memory cell strings CSTR between the bitlines BL and the common source line CSL.

In the second structure 3100S, each of the memory cell strings CSTR may include lower transistors LT1 and LT2 adjacent to the common source line CSL, upper transistors UT1 and UT2 adjacent to the bitlines BL, and a plurality of memory cell transistors MCT between the lower transistors LT1 and LT2 and the upper transistors UT1 and UT2.

In the first structure 3100F, the decoder circuit 3110, the page buffer circuit 3120 and the logic circuit 3130 may correspond to the address decoder 520, the page buffer circuit 530 and the control circuit 560 in FIG. 6, respectively.

The common source line CSL, the first and second lower gate lines LL1 and LL2, the wordlines WL, and the first and second upper gate lines UL1 and UL2 may be electrically connected to the decoder circuit 3110 through first connection wirings 1115 extending to the second structure 3110S in the first structure 3100F. The bitlines BL may be electrically connected to the page buffer circuit 3120 through second connection wirings 3125 extending to the second structure 3100S in the first structure 3100F. The input/output pad 3101 may be electrically connected to the logic circuit 3130 through an input/output connection wiring 3135 extending to the second structure 3100S in the first structure 3100F.

The controller 3200 may include a processor 3210, a NAND controller 3220 and a host interface 3230. The electronic system 3000 may include a plurality of semiconductor devices 3100, and in this case, the controller 3200 may control the plurality of semiconductor devices 3100. The processor 3210, a NAND interface 3221 included in the NAND controller 3220, and the host interface 3230 may correspond to the processor 410, the memory interface 460 and the host interface 440 in FIG. 5, respectively.

Figure 16:
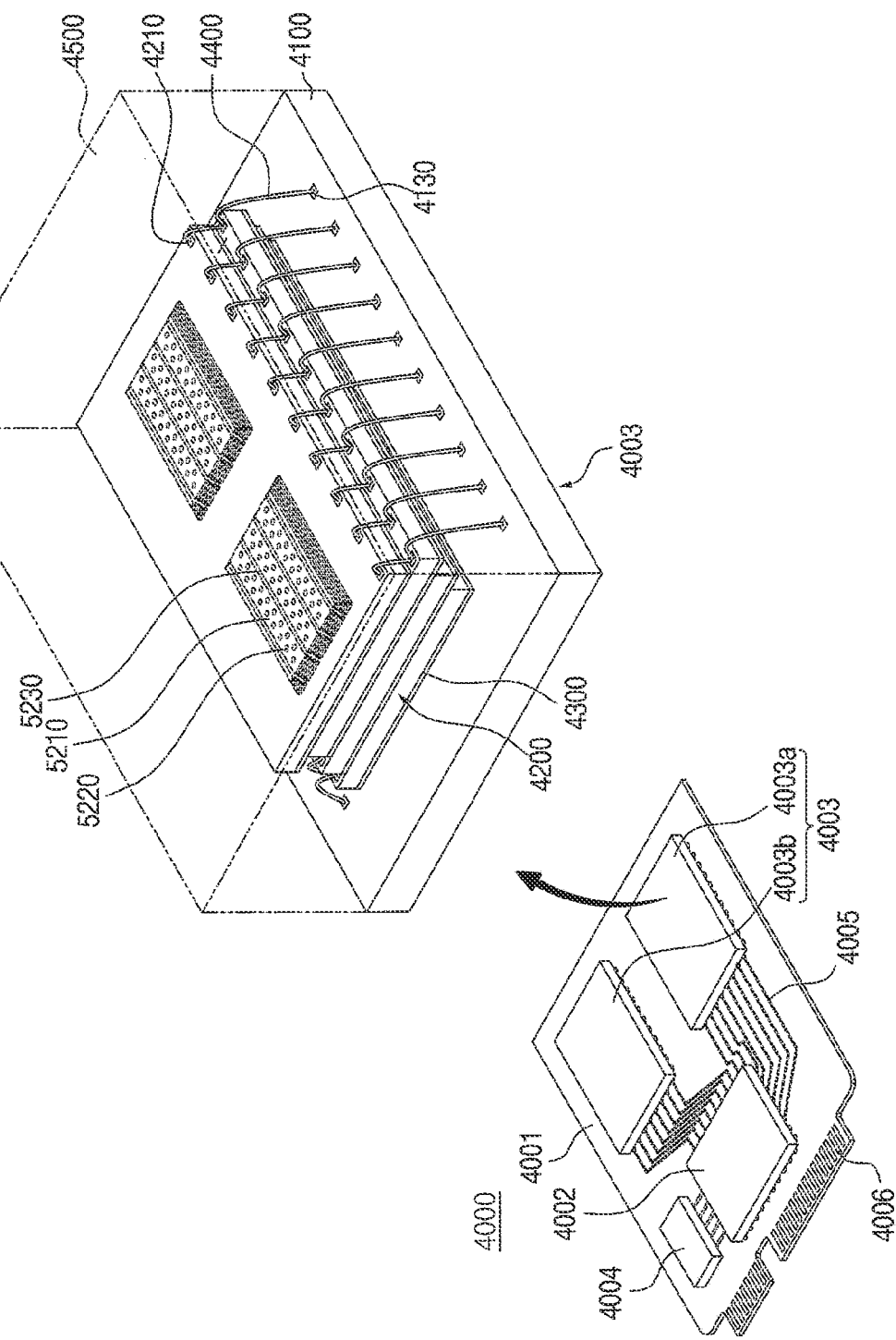
FIG. 16 is a perspective view of an electronic system including a storage device according to exemplary embodiments.

FIG. 16 is a perspective view of an electronic system including a storage device according to exemplary embodiments.

Referring to FIG. 16, an electronic system 4000 may include a main substrate 4001, a controller 4002 mounted on the main substrate 4001, at least one semiconductor package 4003, and a dynamic random access memory (DRAM) device 4004. The semiconductor package 4003 and the DRAM device 4004 may be connected to the controller 4002 by wiring patterns 4005 on the main substrate 4001.

The main substrate 4001 may include a connector 4006 having a plurality of pins connected to an external host. The number and layout of the plurality pins in the connector 4006 may be changed depending on the communication interface between the electronic system 4000 and the external host. In some exemplary embodiments, the electronic system 4000 may be driven or may operate by a power source provided from the external host through the connector 4006.

The controller 4002 may write data in the semiconductor package 4003 or read data from the semiconductor package 4003, and may enhance an operational speed of the electronic system 4000.

The DRAM device 4004 may be a buffer memory for reducing the speed difference between the semiconductor package 4003 for storing data and the external host. The DRAM device 4004 included in the electronic system 4000 may serve as a cache memory, and may provide a space for temporarily storing data during the control operation for the semiconductor package 4003.

The semiconductor package 4003 may include first and second semiconductor packages 4003a and 4003b spaced apart from each other. The first and second semiconductor packages 4003a and 4003b may be semiconductor packages, each of which includes a plurality of semiconductor chips 4200. Each of the first and second semiconductor packages 4003a and 4003b may include a package substrate 4100, the semiconductor chips 4200, bonding layers 4300 disposed under the semiconductor chips 4200, a connection structure 4400 for electrically connecting the semiconductor chips 4200 with the package substrate 4100, and a mold layer 4500 covering the semiconductor chips 4200 and the connection structure 4400 on the package substrate 4100.

The package substrate 4100 may be a printed circuit board (PCB) including package upper pads 4130. Each semiconductor chip 4200 may include an input/output pad 4210. The input/output pad 4210 may correspond to the input/output pad 3101 in FIG. 15. Each semiconductor chip 4200 may include gate electrode structures 5210, memory channel structures 5220 extending through the gate electrode structures 5210, and division structures 5230 for dividing the gate electrode structures 5210. Each semiconductor chip 4200 may include the nonvolatile memory described with reference to FIG. 6.

In some exemplary embodiments, the connection structure 4400 may be a bonding wire for electrically connecting the input/output pad 4210 and the package upper pads 4130. The nonvolatile memory device according to exemplary embodiments may be packaged using various package types or package configurations.

Figure 17:
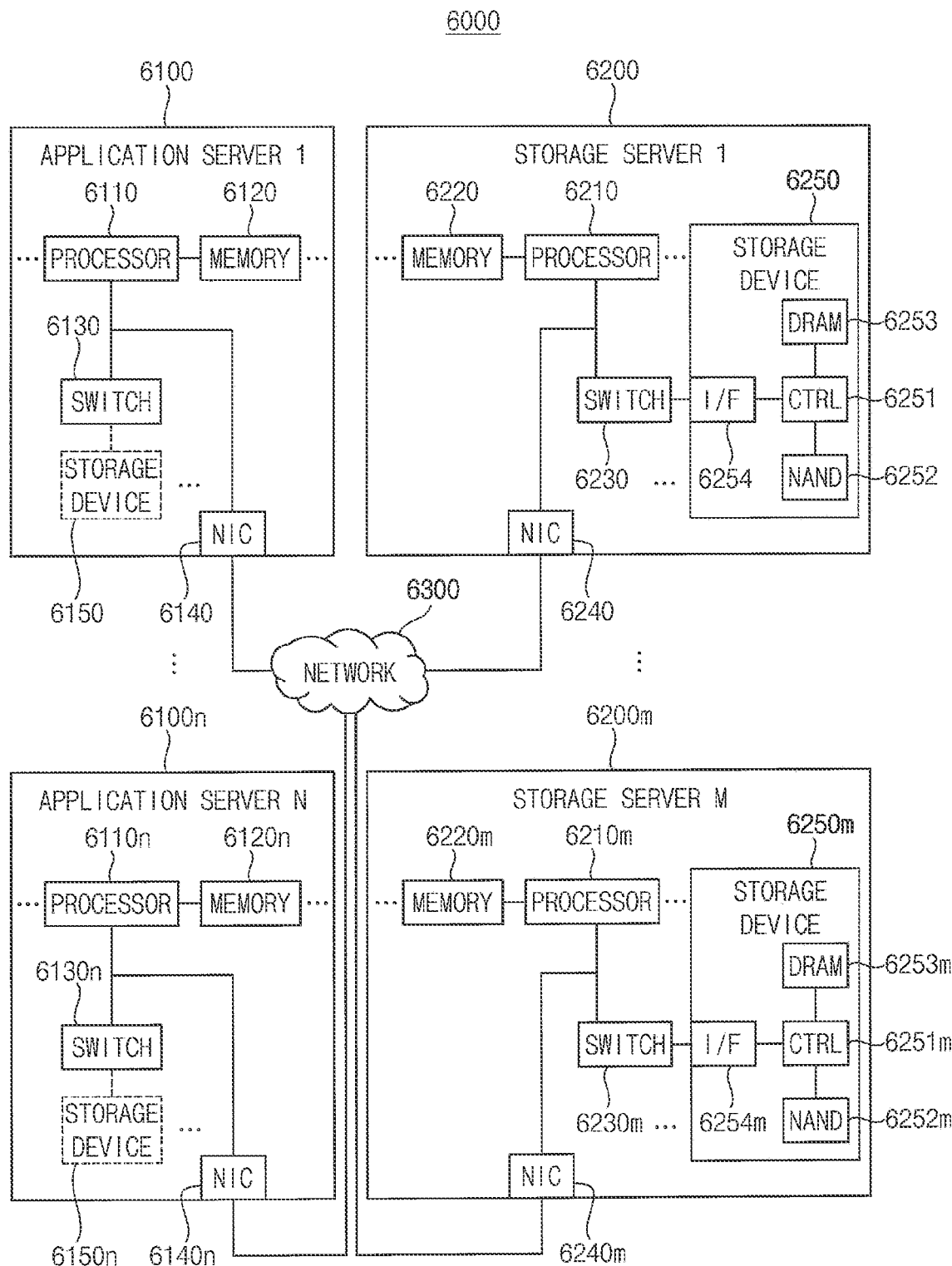
FIG. 17 is a block diagram illustrating a data center including a storage device according to exemplary embodiments.

FIG. 17 is a block diagram illustrating a data center including a storage device according to exemplary embodiments.

Referring to FIG. 17, a data center 6000 may be a facility that collects various types of data and provides various services, and may be referred to as a data storage center. The data center 6000 may be a system for operating search engines and databases, and may be a computing system used by entities such as banks or government agencies. The data center 6000 may include application servers 6100 to 6100n and storage servers 6200 to 6200m. The number of the application servers 6100 to 6100n and the number of the storage servers 6200 to 6200m may be variously selected according to exempary embodiments, and the number of the application servers 6100 to 6100n and the number of the storage servers 6200 to 6200m may be different from each other.

The application server 6100 may include at least one processor 6110 and at least one memory 6120, and the storage server 6200 may include at least one processor 6210 and at least one memory 6220. An operation of the storage server 6200 will be described as an example. The processor 6210 may control overall operations of the storage server 6200, and may access the memory 6220 to execute instructions and/or data loaded in the memory 6220. The memory 6220 may include at least one of a double data rate (DDR) synchronous dynamic random access memory (SDRAM), a high bandwidth memory (HBM), a hybrid memory cube (HMC), a dual in-line memory module (DIMM), an Optane DIMM, a nonvolatile DIMM (NVDIMM), etc. The number of the processors 6210 and the number of the memories 6220 included in the storage server 6200 may be variously selected according to exemplary embodiments. In some exemplary embodiments, the processor 6210 and the memory 6220 may provide a processor-memory pair. In some exemplary embodiments, the number of the processors 6210 and the number of the memories 6220 may be different from each other. The processor 6210 may include a single core processor or a multiple core processor. The above description of the storage server 6200 may be similarly applied to the application server 6100. The application server 6100 may include at least one storage device 6150, and the storage server 6200 may include at least one storage device 6250. In some exemplary embodiments, the application server 6100 may not include the storage device 6150. The number of the storage devices 6250 included in the storage server 6200 may be variously selected according to exemplary embodiments.

The application servers 6100 to 6100n and the storage servers 6200 to 6200m may communicate with each other through a network 6300. The network 6300 may be implemented using a fiber channel (FC) or an Ethernet. The FC may be a medium used for a relatively high speed data transmission, and an optical switch that provides high performance and/or high availability may be used. The storage servers 6200 to 6200*m* may be provided as file storages, block storages or object storages according to an access scheme of the network 6300.

In some exemplary embodiments, the network 6300 may be a storage-only network or a network dedicated to storage such as a storage area network (SAN). For example, the SAN may be an FC-SAN that uses an FC network and is implemented according to an FC protocol (FCP). As another example, the SAN may be an IP-SAN that uses a transmission control protocol/internet protocol (TCP/IP) network and is implemented according to an iSCSI (a SCSI over TCP/IP or an Internet SCSI) protocol. In other exemplary embodiments, the network 6300 may be a general or normal network such as the TCP/IP network. For example, the network 6300 may be implemented according to at least one of protocols such as an FC over Ethernet (FCoE), a network attached storage (NAS), a nonvolatile memory express (NVMe) over Fabrics (NVMe-oF), etc.

Hereinafter, exemplary embodiments will be described based on the application server 6100 and the storage server 6200. The description of the application server 6100 may be applied to the other application server 6100*n*, and the description of the storage server 6200 may be applied to the other storage server 6200*m*.

The application server 6100 may store data requested to be stored by a user or a client into one of the storage servers 6200 to 6200*m* through the network 6300. In addition, the application server 6100 may obtain data requested to be read by the user or the client from one of the storage servers 6200 to 6200*m* through the network 6300. For example, the application server 6100 may be implemented as a web server or a database management system (DBMS).

The application server 6100 may access a memory 6120*n* or a storage device 6150*n* included in the other application server 6100*n* through the network 6300, and/or may access the memories 6220 to 6220*m* or the storage devices 6250 to 6250*m* included in the storage servers 6200 to 6200*m* through the network 6300. Thus, the application server 6100 may perform various operations on data stored in the application servers 6100 to 6100*n* and/or the storage servers 6200 to 6200*m*. For example, the application server 6100 may execute a command for moving or copying data between the application servers 6100 to 6100*n* and/or the storage servers 6200 to 6200*m*. The data may be transferred from the storage devices 6250 to 6250*m* of the storage servers 6200 to 6200*m* to the memories 6120 to 6120*n* of the application servers 6100 to 6100*n* directly or through the memories 6220 to 6220*m* of the storage servers 6200 to 6200*m*. For example, the data transferred through the network 6300 may be encrypted data for security or privacy.

In the storage server 6200, an interface 6254 may provide a physical connection between the processor 6210 and a controller 6251 and/or a physical connection between a network interface card (NIC) 6240 and the controller 6251. For example, the interface 6254 may be implemented based on a direct attached storage (DAS) scheme in which the storage device 6250 is directly connected with a dedicated cable. For example, the interface 6254 may be implemented based on at least one of various interface schemes such as an advanced technology attachment (ATA), a serial ATA (SATA) an external SATA (e-SATA), a small computer system interface (SCSI), a serial attached SCSI (SAS), a peripheral component interconnection (PCI), a PCI express (PCIe), an NVMe, an IEEE 1394, a universal serial bus (USB), a secure digital (SD) card interface, a multi-media card (MMC) interface, an embedded MMC (eMMC) interface, a universal flash storage (UFS) interface, an embedded UFS (eUFS) interface, a compact flash (CF) card interface, etc.

The storage server 6200 may further include a switch 6230 and the NIC 6240. The switch 6230 may selectively connect the processor 6210 with the storage device 6250 or may selectively connect the NIC 6240 with the storage device 6250 under a control of the processor 6210. Similarly, the application server 6100 may further include a switch 6130 and an NIC 6140.

In some exemplary embodiments, the NIC 6240 may include a network interface card, a network adapter, or the like. The NIC 6240 may be connected to the network 6300 through a wired interface, a wireless interface, a Bluetooth interface, an optical interface, or the like. The NIC 6240 may further include an internal memory, a digital signal processor (DSP), a host bus interface, or the like, and may be connected to the processor 6210 and/or the switch 6230 through the host bus interface. The host bus interface may be implemented as one of the above-described examples of the interface 6254. In some exemplary embodiments, the NIC 6240 may be integrated with at least one of the processor 6210, the switch 6230 and the storage device 6250.

In the storage servers 6200 to 6200*m* and/or the application servers 6100 to 6100*n*, the processor may transmit a command to the storage devices 6150 to 6150*n* and 6250 to 6250*m* or the memories 6120 to 6120*n* and 6220 to 6220*m* to program or read data. For example, the data may be error-corrected data by an error correction code (ECC) engine. For example, the data may be processed by a data bus inversion (DBI) or a data masking (DM), and may include cyclic redundancy code (CRC) information. For example, the data may be encrypted data for security or privacy.

The storage devices 6150 to 6150*m* and 6250 to 6250*m* may transmit a control signal and command/address signals to NAND flash memory devices 6252 to 6252*m* in response to a read command received from the processor. When data is read from the NAND flash memory devices 6252 to 6252*m*, a read enable (RE) signal may be input as a data output control signal and may serve to output data to a DQ bus. A data strobe signal (DQS) may be generated using the RE signal. The command and address signals may be latched in a page buffer based on a rising edge or a falling edge of a write enable (WE) signal.

The controller 6251 may control overall operations of the storage device 6250. In some exemplary embodiments, the controller 6251 may include a static random access memory (SRAM). The controller 6251 may write data into the NAND flash memory device 6252 in response to a write command, or may read data from the NAND flash memory device 6252 in response to a read command. For example, the write command and/or the read command may be provided from the processor 6210 in the storage server 6200, the processor 6210*m* in the other storage server 6200*m*, or the processors 6110 to 6110*n* in the application servers 6100 to 6100*n*. A DRAM 6253 may temporarily store (e.g., may buffer) data to be written to the NAND flash memory device 6252 or data read from the NAND flash memory device 6252. Further, the DRAM 6253 may store meta data. The meta data may be data generated by the controller 6251 to manage user data or the NAND flash memory device 6252.

The storage device 6250 may be a storage device according to exemplary embodiments, and may perform the method of operating the storage device according to such exemplary embodiments.

The inventive concept may be applied to various electronic devices and systems that include the storage devices and the storage systems. For example, the inventive concept may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

The foregoing are illustrative of exemplary embodiments and are not to be construed as limiting thereof. Although some exemplary embodiments have been described, those skilled in the art will readily appreciate that many modifications are possible in such exemplary embodiments without materially departing from the novel teachings and advantages of the exemplary embodiments. Accordingly, all such modifications are intended to be included within the scope of the exemplary embodiments as defined in the following claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. A method of operating a storage device including a storage controller and a nonvolatile memory, the method comprising:
   powering on the storage device based on an activation of an external power supply voltage;
   waiting for an establishment of communication with a host device based on a link signal between the storage device and the host device; and
   without the establishment of communication with the host device, performing a retention enhancement operation on the storage device by entering a retention enhancement mode and by providing at least one command from the storage controller to the nonvolatile memory.

2. The method of claim 1, wherein, in response to an establishment of communication waiting time becoming longer than a first reference time, the storage device is configured to enter the retention enhancement mode and to perform the retention enhancement operation.

3. The method of claim 2, wherein the establishment of communication waiting time starts from a time point at which the external power supply voltage is activated.

4. The method of claim 3, wherein:
   in response to the link signal being deactivated even after the first reference time having elapsed from the time point at which the external power supply voltage is activated, the storage device is configured to determine that the establishment of communication with the host device has failed, and
   in response to the establishment of communication with the host device having failed, the storage device is configured to enter the retention enhancement mode and to perform the retention enhancement operation.

5. The method of claim 1, further comprising:
   in response to the establishment of communication with the host device being successfully completed, performing a normal operation on the storage device by entering a normal operation mode.

6. The method of claim 5, further comprising:
   while the storage device enters the retention enhancement mode and performs the retention enhancement operation, checking whether the communication establishment with the host device has successfully completed.

7. The method of claim 6, wherein, in response to the establishment of communication with the host device being successfully completed while the storage device enters the retention enhancement mode and performs the retention enhancement operation, the storage device is configured to stop the retention enhancement operation, to exit the retention enhancement mode, and to enter the normal operation mode and perform the normal operation.

8. The method of claim 7, wherein:
   in response to the link signal being activated while the storage device enters the retention enhancement mode and performs the retention enhancement operation, the storage device is configured to determine that the establishment of communication with the host device has successfully completed,
   in response to the establishment of communication with the host device being successfully completed, the storage device is configured to stop the retention enhancement operation and to exit the retention enhancement mode, and
   in response to the storage device exiting the retention enhancement mode, the storage device is configured to enter the normal operation mode and to perform the normal operation.

9. The method of claim 1, wherein performing the retention enhancement operation on the storage device includes:
   performing a read operation on first data based on a read command, the first data being stored in a first region among a plurality of regions included in the nonvolatile memory; and
   selectively performing a reprogram operation on the first data.

10. The method of claim 9, wherein selectively performing the reprogram operation on the first data includes:
    in response to a number of first error bits included in the first data being greater than a first reference number, performing the reprogram operation on the first data based on a reprogram command; and
    in response to the number of the first error bits is less than or equal to the first reference number, omitting the reprogram operation on the first data.

11. The method of claim 10, wherein the first reference number is variable.

12. The method of claim 10, wherein the first reference number is less than a second reference number used to determine whether the first data is degraded while a normal operation is performed on the storage device.

13. The method of claim 10, wherein performing the reprogram operation on the first data based on the reprogram command includes:
    storing the first data into a second region different from the first region among the plurality of regions.

14. The method of claim 9, wherein performing the retention enhancement operation on the storage device further includes:

in response to the read operation being completed on all of the plurality of regions, waiting in the retention enhancement mode by finishing the retention enhancement operation.

15. The method of claim 14, wherein, in response to a retention enhancement waiting time becoming longer than a second reference time, the storage device is configured to perform the retention enhancement operation again.

16. The method of claim 15, wherein the retention enhancement waiting time starts from a time point at which the retention enhancement operation has finished.

17. The method of claim 1, wherein an interface between the host device and the storage device is formed based on one of a small computer small interface (SCSI), serial attached SCSI (SAS), peripheral component interconnect express (PCIe) and serial advanced technology attachment (SATA).

18. A storage device comprising:
a storage controller; and
a nonvolatile memory controlled by the storage controller, and
wherein:
the storage device is powered on based on an activation of an external power supply voltage,
the storage controller is configured to wait for establishment of communication with a host device based on a link signal between the storage device and the host device, and
without the establishment of communication with the host device, the storage controller is configured to perform a retention enhancement operation by entering a retention enhancement mode and by providing at least one command to the nonvolatile memory.

19. The storage device of claim 18, wherein the storage controller includes:
a measurer configured to measure an establishment of communication waiting time from a time point at which the external power supply voltage is activated; and
a retention enhancement driver configured to determine that the establishment of communication with the host device has failed in response to the establishment of communication waiting time becoming longer than a first reference time, and to enter the retention enhancement mode and to perform the retention enhancement operation in response to the establishment of communication with the host device having failed.

20. A method of operating a storage device including a storage controller and a nonvolatile memory, the method comprising:
powering on the storage device based on an activation of an external power supply voltage;
waiting for an establishment of communication with a host device based on a link signal between the storage device and the host device;
in response to the establishment of communication with the host device being successfully completed, entering a normal operation mode;
performing a normal operation in the normal operation mode;
measuring an establishment of communication waiting time starting from a time point at which the external power supply voltage is activated;
in response to the establishment of communication waiting time becoming longer than a first reference time, entering a retention enhancement mode without the establishment of communication with the host device;
performing a retention enhancement operation in the retention enhancement mode by providing a read command and a reprogram command from the storage controller to the nonvolatile memory; and
in response to the communication establishment of communication with the host device being successfully completed in the retention enhancement mode, exiting the retention enhancement mode and entering the normal operation mode, and
wherein a criterion for determining whether data is degraded in the retention enhancement mode is higher than a criterion for determining whether data is degraded in the normal operation mode.

* * * * *